US008670622B2

(12) United States Patent
Kono et al.

(10) Patent No.: US 8,670,622 B2
(45) Date of Patent: Mar. 11, 2014

(54) IMAGE PROCESSING APPARATUS, IMAGE PROCESSING METHOD, AND COMPUTER-READABLE RECORDING MEDIUM

(75) Inventors: Takashi Kono, Tachikawa (JP); Yamato Kanda, Hino (JP); Makoto Kitamura, Hachioji (JP); Takehiro Matsuda, Hachioji (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 231 days.

(21) Appl. No.: 13/207,819

(22) Filed: Aug. 11, 2011

(65) Prior Publication Data

US 2012/0076419 A1  Mar. 29, 2012

(30) Foreign Application Priority Data

Sep. 29, 2010 (JP) ................................. 2010-219901

(51) Int. Cl.
*G06K 9/48* (2006.01)

(52) U.S. Cl.
USPC ........................................................ 382/199

(58) Field of Classification Search
USPC ........................................ 382/199, 266, 269
See application file for complete search history.

(56) References Cited

U.S. PATENT DOCUMENTS

2002/0159638 A1  10/2002 Ratner et al.
2006/0050966 A1  3/2006 Nishimura et al.

FOREIGN PATENT DOCUMENTS

| EP | 1 842 481 A1 | 10/2007 |
| JP | 07-225847 | 8/1995 |
| JP | 2007-140684 | 6/2007 |

OTHER PUBLICATIONS

Canny, J., "A Computational Approach to Edge Detection", IEEE Transactions on Pattern Analysis and Machine Intelligence (Nov. 1986), vol. 8, No. 6, pp. 679-698.
Gonzales, R. C. et al. "Digital Image Processing, Third Edition", 2008, pp. 719-727.
Ziou, D. et al., "Adaptive Elimination of False Edges for First Order Detectors", Image Analysis and Processing, 8$^{th}$ International Conference, ICIAP '95 Proceedings, Sep. 13, 1995, pp. 89-94.
Wang, Lu. et al., "Supporting Range and Segment-based Hysteresis Thresholding in Edge Detection" Image Processing, 2008, ICIP 2008, 15$^{th}$ IEEE International Conference, Piscataway, New Jersey, USA, Oct. 12, 2008, pp. 609-612.
Ziou, D. "The Influence of Edge Direction on the Estimation of Edge Contrast and Orientation", Pattern Recognition vol. 34, No. 4, Apr. 1, 2001, pp. 855-863.
European Search Report dated Feb. 27, 2012 from corresponding European Patent Application No. EP 11 00 6228.8.

*Primary Examiner* — Daniel Mariam
(74) *Attorney, Agent, or Firm* — Scully, Scott, Murphy & Presser, P.C.

(57) ABSTRACT

An image processing apparatus includes a gradient magnitude calculating unit that calculates a gradient magnitude of each pixel on the basis of pixel values of a target image in which a predetermined target object is imaged; a candidate-edge detecting unit that detects contour-candidate edge positions on the basis of the gradient magnitude of each pixel; a reference-range setting unit that sets a reference range, which is to be referred to when a contour edge position is selected from among the contour-candidate edge positions, on the basis of the gradient magnitude of each pixel; and a contour-edge selecting unit that selects, as the contour edge position, one of the contour-candidate edge positions in the reference range.

20 Claims, 27 Drawing Sheets

— : GRADIENT
---- : GRADIENT-MAGNITUDE

| -1 | 0 | 1 |
|----|---|---|
| -2 | 0 | 2 |
| -1 | 0 | 1 |

| -1 | -2 | -1 |
|----|----|----|
| 0  | 0  | 0  |
| 1  | 2  | 1  |

DIRECTION = 0  (−0.4142<tan θ ≤0.4142)
DIRECTION = 1  (−2.4142<tan θ ≤−0.4142)
DIRECTION = 2  (tan θ ≤−2.4142, 2.4142≤tan θ )
DIRECTION = 3  (0.4142<tan θ <2.4142)

DIRECTION = 0

DIRECTION = 1

DIRECTION = 2

DIRECTION = 3

☐ FLAT
▨ UPWARD GRADIENT
▦ DOWNWARD GRADIENT

☐ FLAT
▨ UPWARD GRADIENT
▦ DOWNWARD GRADIENT

FIG.20
(a)
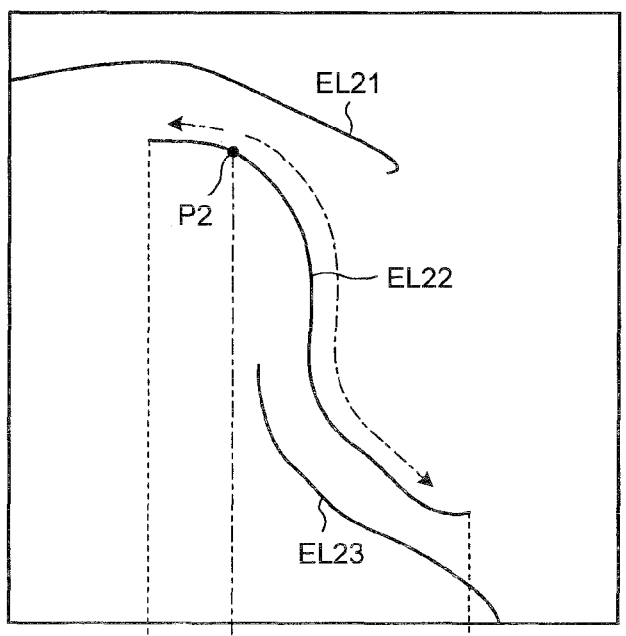
(b)
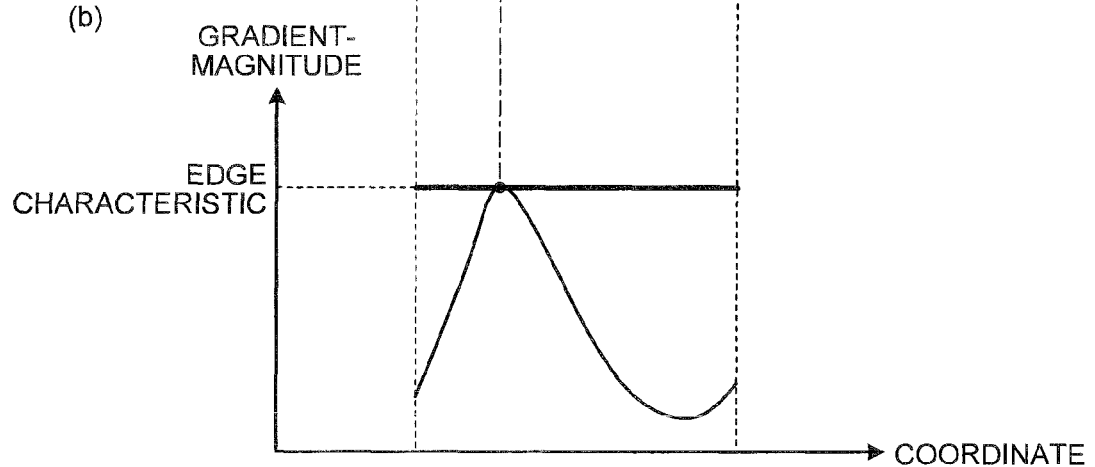

FIG. 32
(a)
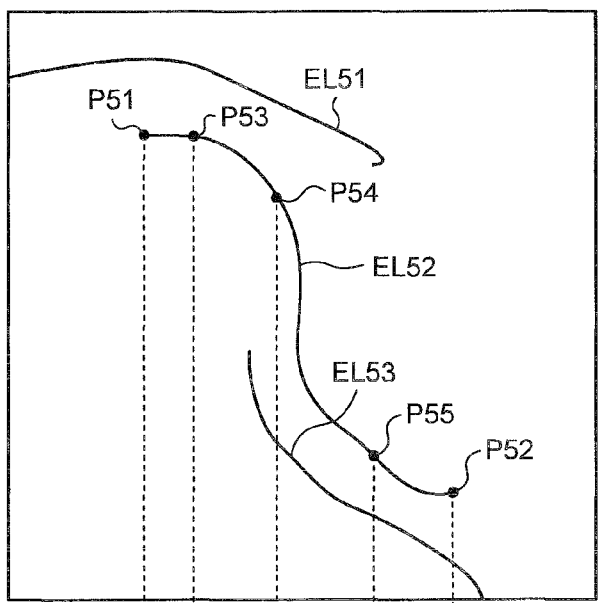
(b)
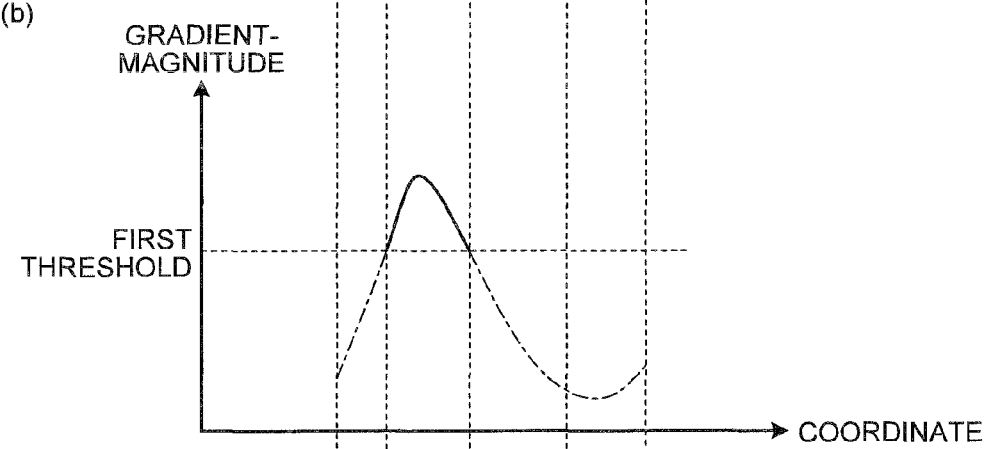
(c)
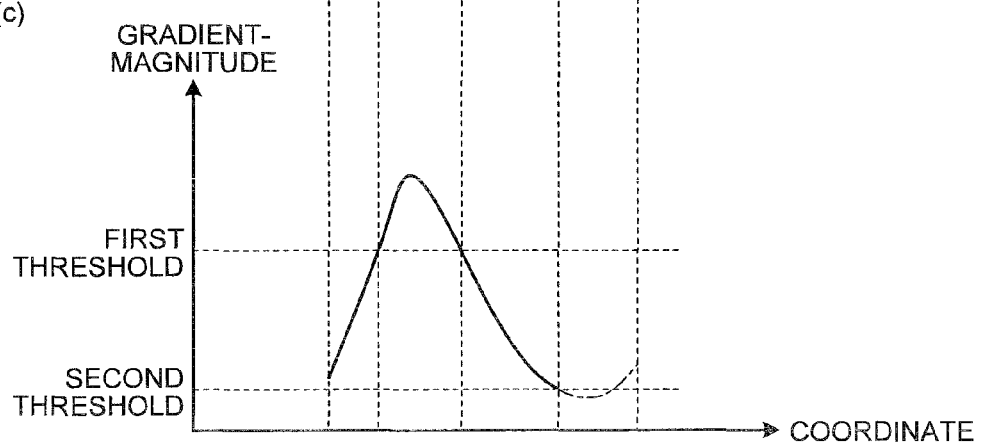

IMAGE PROCESSING APPARATUS, IMAGE PROCESSING METHOD, AND COMPUTER-READABLE RECORDING MEDIUM

CROSS-REFERENCE TO RELATED APPLICATIONS

This application is based upon and claims the benefit of priority from Japanese Patent Application No. 2010-219901, filed on Sep. 29, 2010, the entire contents of which are incorporated herein by reference.

BACKGROUND OF THE INVENTION

1. Field of the Invention

The present invention relates to an image processing apparatus, an image processing method, and a computer-readable recording medium for detecting a contour edge of a target object from a target image.

2. Description of the Related Art

In general, edges in an image are detected by detecting positions where gradients largely change. Basically, edges are detected by calculating gradient magnitudes from gradients of luminance values in an image and performing thresholding on the gradient magnitudes. Various detailed techniques have been developed, and as one of these techniques, Canny edge detection algorithm is known (see Canny edge detector, J. Canny, "A Computational Approach to Edge Detection", IEEE Trans. on Pattern Analysis and Machine Intelligence, 8(6), pp. 679-698, 1986). Japanese Laid-open Patent Publication No. 2007-140684 discloses a method of detecting edges while suppressing noise edges. In Japanese Laid-open Patent Publication No. 2007-140684, luminance gradient values in four directions are calculated, and a first gradient value corresponding to a direction of an edge and a second gradient value corresponding to a direction perpendicular to the edge are estimated on the basis of the magnitudes of the luminance gradient values in the four directions. Thereafter, a relative magnitude of the first gradient value to the second gradient value is obtained as edge strength in order to discriminate an edge caused by a structure of a target object from an edge caused by noise. Japanese Laid-open Patent Publication No. 07-225847 discloses processing of detecting a contour edge of a target object. In Japanese Laid-open Patent Publication No. 07-225847, a thick rough contour line is input for a target object of which contour is to be extracted, and the greatest gradient magnitude is repeatedly traced by taking a pixel position with the greatest gradient magnitude as a start point within the thick rough contour line, so that a contour line is extracted.

SUMMARY OF THE INVENTION

An image processing apparatus according to an aspect of the present invention includes a gradient-magnitude calculating unit that calculates a gradient magnitude of each pixel on the basis of pixel values of a target image in which a predetermined target object is imaged; a candidate-edge detecting unit that detects contour-candidate edge positions on the basis of the gradient magnitude of each pixel; a reference-range setting unit that sets a reference range, which is to be referred to when a contour edge position is selected from among the contour-candidate edge positions, on the basis of the gradient magnitude of each pixel; and a contour-edge selecting unit that selects, as the contour edge position, one of the contour-candidate edge positions in the reference range.

An image processing method according to another aspect of the present invention includes calculating a gradient magnitude of each pixel on the basis of pixel values of a target image in which a predetermined target object is imaged; detecting contour-candidate edge positions on the basis of the gradient magnitude of each pixel; setting a reference range, which is to be referred to when a contour edge position is selected from among the contour-candidate edge positions, on the basis of the gradient magnitude of each pixel; and selecting, as the contour edge position, one of the contour-candidate edge positions in the reference range.

An image processing method according to still another aspect of the present invention includes calculating a gradient magnitude of each pixel on the basis of pixel values of a target image in which a predetermined target object is imaged; setting a reference range, which is to be referred to when a contour edge position is selected from among contour-candidate edge positions, on the basis of the gradient magnitude of each pixel; detecting contour-candidate edge positions in the reference range on the basis of gradient magnitudes of pixels contained in the reference range; and selecting, as the contour edge position, one of the contour-candidate edge positions in the reference range.

A non-transitory computer-readable recording medium according to still another aspect of the present invention has an executable program stored thereon, wherein the program instructs a processor to perform: calculating a gradient magnitude of each pixel on the basis of pixel values of a target image in which a predetermined target object is imaged; detecting contour-candidate edge positions on the basis of the gradient magnitude of each pixel; setting a reference range, which is to be referred to when a contour edge position is selected from among the contour-candidate edge positions, on the basis of the gradient magnitude of each pixel; and selecting, as the contour edge position, one of the contour-candidate edge positions in the reference range.

A non-transitory computer-readable recording medium according to still another aspect of the present invention has an executable program stored thereon, wherein the program instructs a processor to perform: calculating a gradient magnitude of each pixel on the basis of pixel values of a target image in which a predetermined target object is imaged; setting a reference range, which is to be referred to when a contour edge position is selected from among contour-candidate edge positions, on the basis of the gradient magnitude of each pixel; detecting contour-candidate edge positions in the reference range on the basis of gradient magnitudes of pixels contained in the reference range; and selecting, as the contour edge position, one of the contour-candidate edge positions in the reference range.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 20 is a diagram explaining a principle of acquisition of an edge characteristic;

FIG. 32 is a diagram explaining a principle of detection of contour-candidate edge positions;

DETAILED DESCRIPTION OF THE PREFERRED EMBODIMENTS

Figure 1:
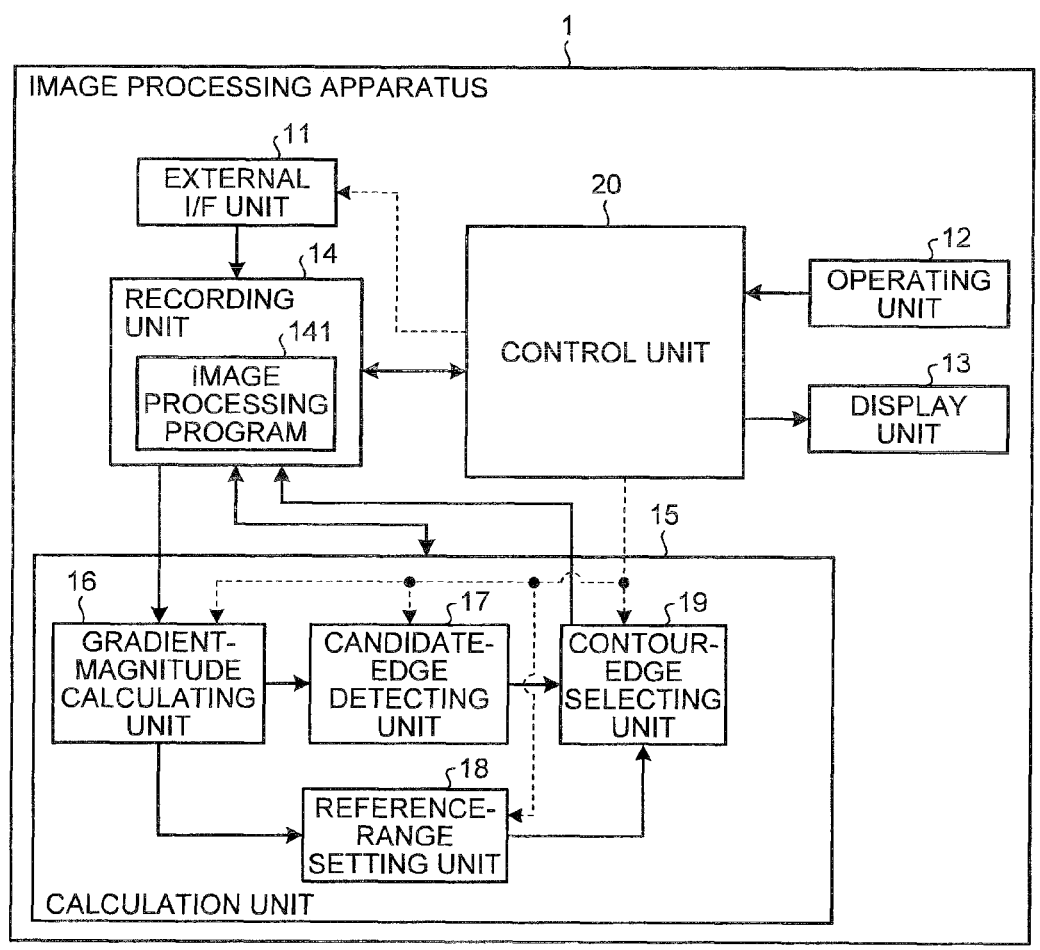
FIG. 1 is a block diagram of a functional configuration example of an image processing apparatus according to a first embodiment.

Exemplary embodiments of the present invention will be explained below with reference to the accompanying drawings. The present invention is not limited by the following embodiments. In the drawings, the same components are denoted by the same reference codes.

An image processing apparatus according to an embodiment processes, as a target image, an image (an intraluminal image) that is obtained by imaging the inside of a lumen, such as a digestive tract, in the body of a subject by a medical observation device, such as an endoscope or a capsule endoscope. More specifically, the image processing apparatus performs processing of detecting a contour edge from an intraluminal image. The intraluminal image that the image processing apparatus of the embodiment handles is, for example, a color image in which pixel values corresponding to respective wavelength components for R (red), G (green), and B (blue) are assigned to each pixel. In the intraluminal image, a mucosal structure of a body tissue appears as a target object. In the following, an example will be explained in which a contour edge of a mucosal structure is detected from an intraluminal image. However, the target image is not limited to the intraluminal image that is explained as an example in the embodiment. Also, the target object is not limited to the mucosal structure. The present invention can be widely applied to any cases in which a contour edge of a target object is detected from a target image that is obtained by imaging a predetermined target object.

First Embodiment

Figure 2:
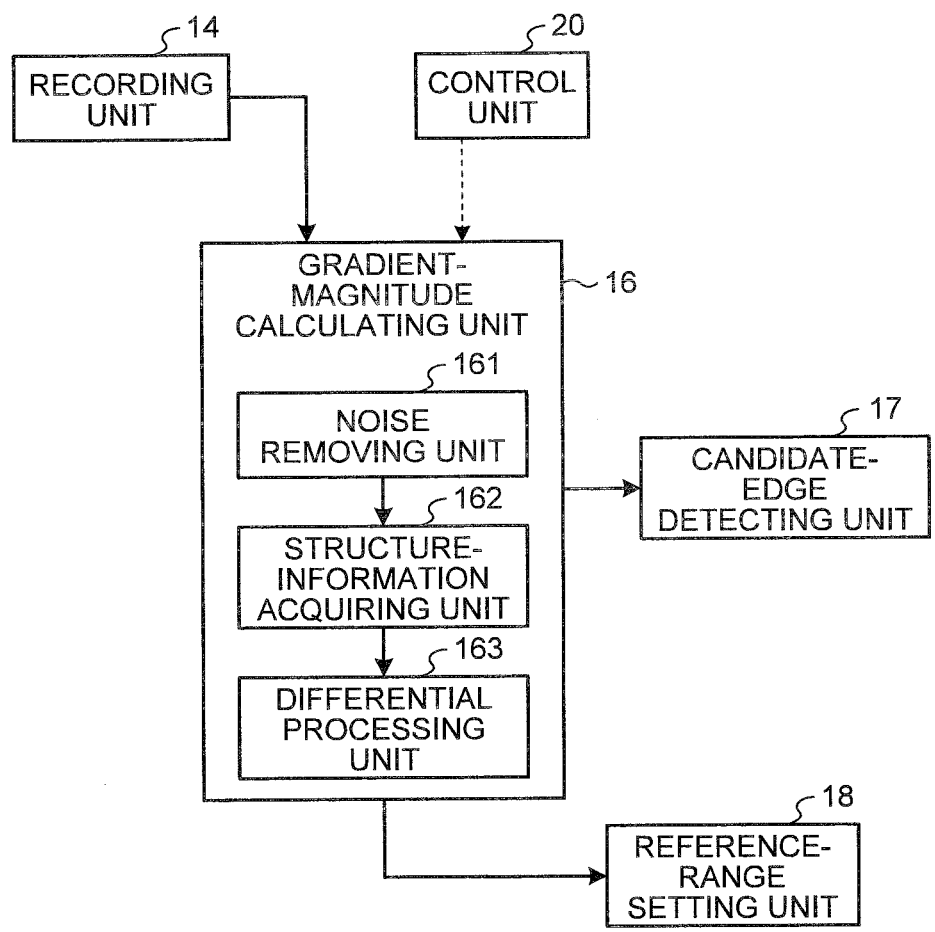
FIG. 2 is a block diagram of a configuration example of a gradient-magnitude calculating unit.
Figure 3:
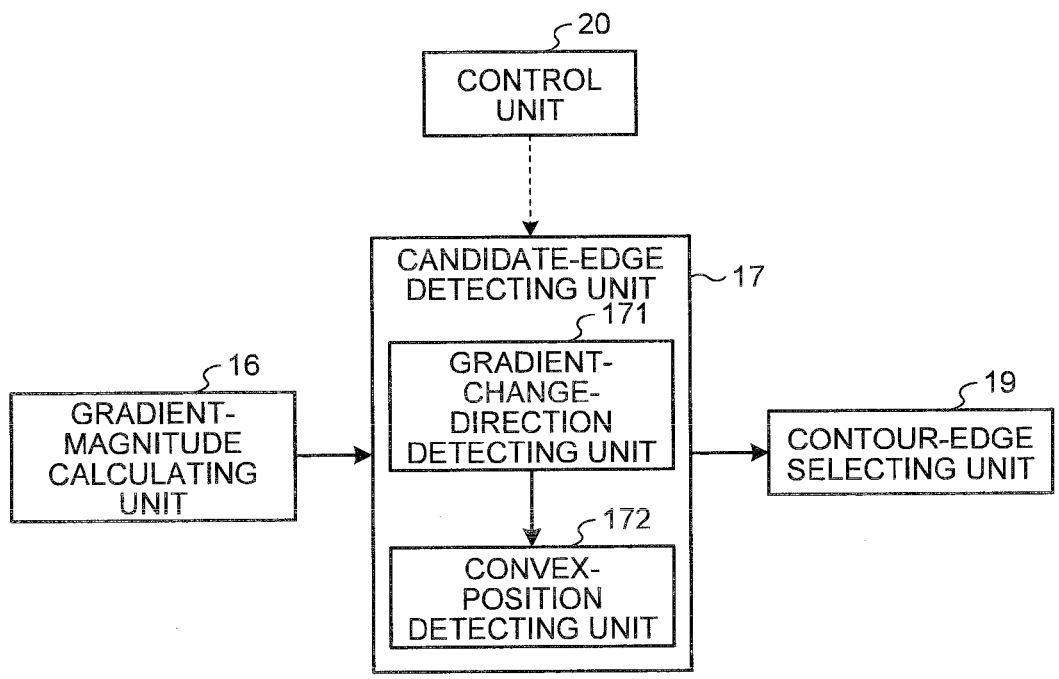
FIG. 3 is a block diagram of a configuration example of a candidate-edge detecting unit according to the first embodiment.
Figure 4:
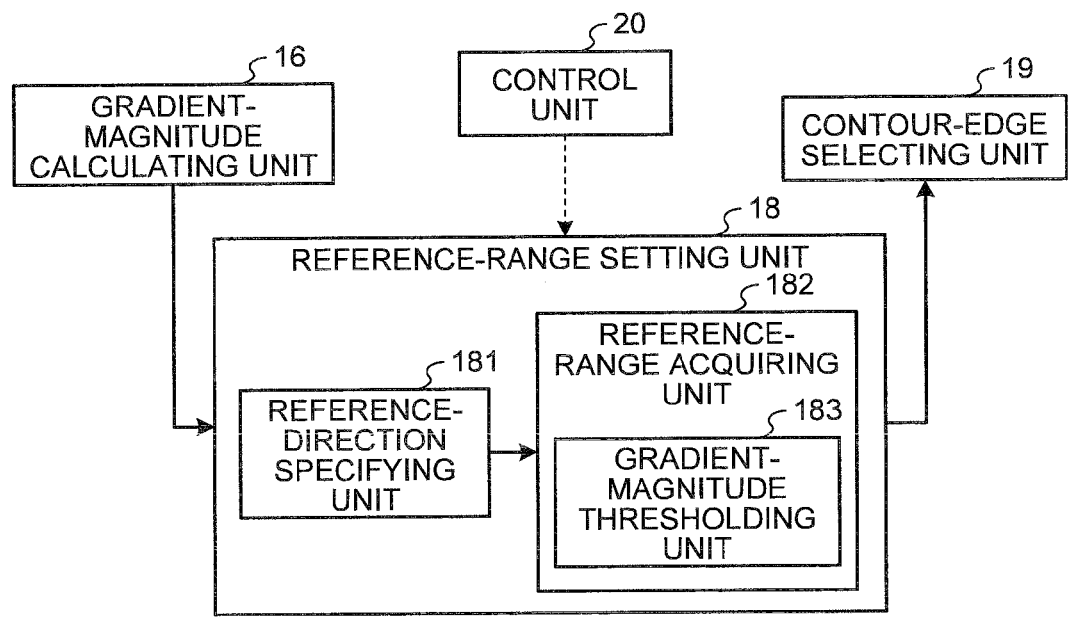
FIG. 4 is a block diagram of a configuration example of a reference-range setting unit according to the first embodiment.
Figure 5:
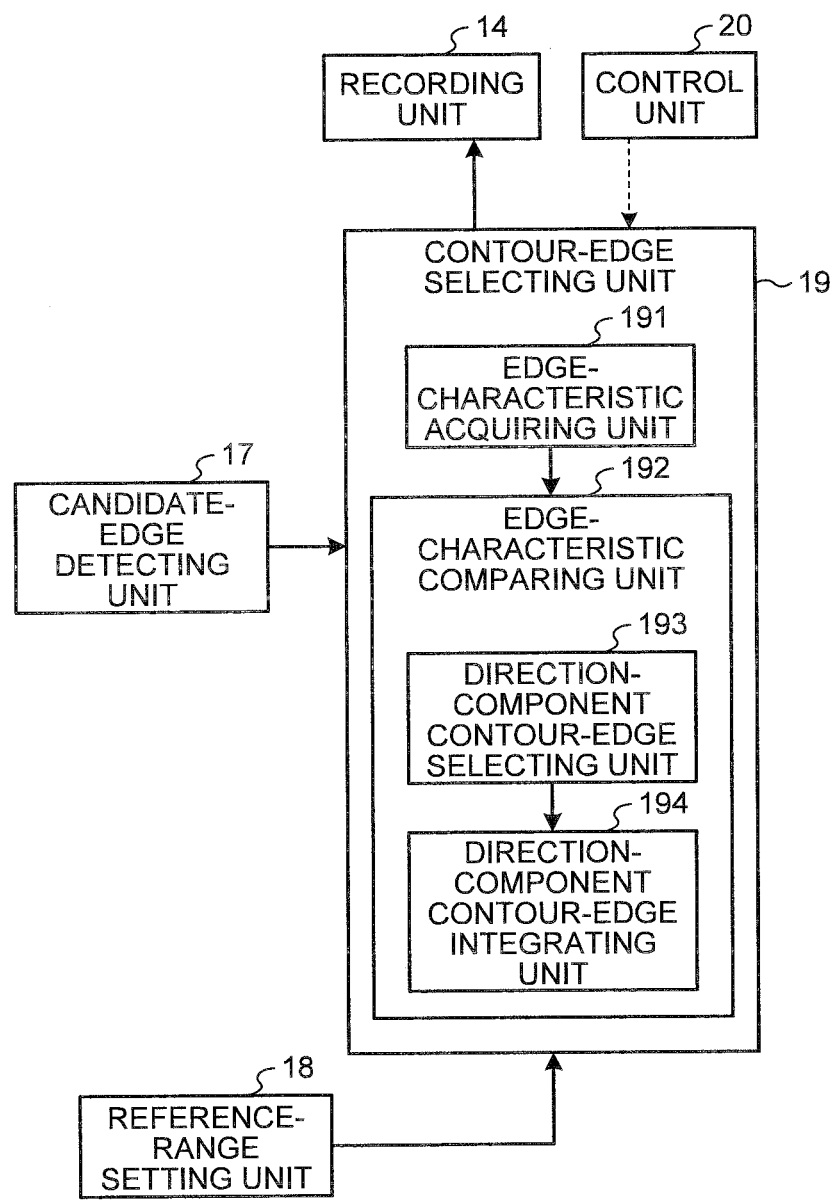
FIG. 5 is a block diagram of a configuration example of a contour-edge selecting unit according to the first embodiment.

An image processing apparatus according to a first embodiment will be explained first. FIG. 1 is a block diagram of a functional configuration example of an image processing apparatus 1 according to the first embodiment. FIG. 2 is a block diagram of a configuration example of a gradient-magnitude calculating unit 16 included in a calculation unit 15 according to the first embodiment. FIG. 3 is a block diagram of a configuration example of a candidate-edge detecting unit 17 according to the first embodiment. FIG. 4 is a block diagram of a configuration example of a reference-range setting unit 18 according to the first embodiment. FIG. 5 is a block diagram of a configuration example of a contour-edge selecting unit 19 according to the first embodiment. In FIGS. 1 to 5, data signal lines used for connecting the units of the image processing apparatus 1 to one another and sending data signals, such as image signals, are indicated by bold lines and control signal lines used for sending control signals are indicated by dashed lines.

As illustrated in FIG. 1, the image processing apparatus 1 of the first embodiment includes an external interface (I/F) unit 11, an operating unit 12, a display unit 13, a recording unit 14, the calculation unit 15, and a control unit 20 that controls the whole operation of the image processing apparatus 1.

The external I/F unit 11 is used for acquiring image data of an intraluminal image captured by a medical observation device. The image data acquired by the external I/F unit 11 is recorded in the recording unit 14, processed by the calculation unit 15, and appropriately displayed on the display unit 13 as needed. When, for example, a portable recording medium is used for exchanging the image data with the medical observation device, the external I/F unit 11 is structured as a reader device that reads the image data of the intraluminal image stored in the recording medium that is detachably attached thereto. When a server for storing the image data of the intraluminal image captured by the medical observation device is installed in an appropriate location such that the image data can be acquired from the server, the external I/F unit 11 is structured as a communication device or the like that makes a connection to the server. In this case, data communication with the server is performed via the external I/F unit 11 in order to acquire the image data of the intraluminal image. When the image data is to be acquired from the medical observation device via a cable, the external I/F unit 11 is structured as an interface device or the like that inputs the image data.

The operating unit 12 is realized by, for example, a keyboard, a mouse, a touch panel, or various switches and outputs an operating signal to the control unit 20. The display unit 13 is realized by a display device, such as an LCD or an EL display, and displays various screens including a screen for displaying an image captured by a medical observation device, such as a capsule endoscope, by being controlled by the control unit 20.

The recording unit 14 is realized by an information recording medium and a reader device of the information recording medium. Examples of the information recording medium include a ROM as an IC memory, such as a flash memory, that can update recorded information; a RAM as an IC memory; an internal hard disk; a hard disk that is connectable via a data communication terminal; and a CD-ROM. In the recording unit 14, a computer program for operating the image processing apparatus 1 and realizing various functions of the image processing apparatus 1, data to be used while the computer program is being executed, and the like are recorded. For example, the image data of the intraluminal image acquired by the external I/F unit 11 is recorded in the recording unit 14. Furthermore, in the recording unit 14, an image processing program 141 is recorded that is used for implementing processing of the first embodiment in order to detect a contour edge (more specifically, a contour edge of a mucosal structure) from the intraluminal image.

The calculation unit 15 is realized by hardware, such as a CPU, and performs various types of arithmetic processing in order to process the intraluminal image to detect the contour edge. The calculation unit 15 includes the gradient-magnitude calculating unit 16, the candidate-edge detecting unit 17, the reference-range setting unit 18, and the contour-edge selecting unit 19. The gradient-magnitude calculating unit 16, the candidate-edge detecting unit 17, and the contour-edge selecting unit 19 are connected to one another in this order. The gradient-magnitude calculating unit 16 is also connected to the reference-range setting unit 18, and the reference-range setting unit 18 is also connected to the contour-edge selecting unit 19. The gradient-magnitude calculating unit 16 receives input of an image signal of the intraluminal image that has been acquired via the external I/F unit 11 and recorded in the recording unit 14. The contour-edge selecting unit 19 outputs information on a contour edge (a contour edge image) that is detected by processing the intraluminal image by the units of the calculation unit 15, and the information is recorded in, for example, the recording unit 14.

The gradient-magnitude calculating unit 16 calculates a gradient magnitude of each pixel on the basis of pixel values of the intraluminal image. The gradient-magnitude calculating unit 16 includes, as illustrated in FIG. 2, a noise removing unit 161, a structure-information acquiring unit 162, and a differential processing unit 163. The noise removing unit 161, the structure-information acquiring unit 162, and the differential processing unit 163 are connected to one another in this order.

The noise removing unit 161 removes noise from the intraluminal image on the basis of the image data of the intraluminal image input from the recording unit 14. The image data of the intraluminal image from which the noise has been removed is output to the structure-information acquiring unit 162. The structure-information acquiring unit 162 acquires shape change information on a surface of a mucosal structure that appears in the intraluminal image (the information is, for example, image data of an R-component image, which will be described later), on the basis of the input image data of the intraluminal image from which the noise has been removed. The acquired shape change information on the surface of the mucosal structure (the image data of the R-component image) is output to the differential processing unit 163. The differential processing unit 163 performs differential filter processing on the input shape change information on the surface of the mucosal structure (the image data of the R-component image) to thereby calculate the gradient magnitude of each pixel. More specifically, the differential processing unit 163 calculates a lateral component of the gradient magnitude of each pixel by using a differential filter for a lateral direction (a horizontal direction) and calculates a longitudinal component of the gradient magnitude of each pixel by using a differential filter for a longitudinal direction (a vertical direction), so that a signed gradient magnitude is calculated for each of the lateral direction and the longitudinal direction. The gradient-magnitude calculating unit 16 structured as above outputs the calculated gradient magnitude of each pixel to the candidate-edge detecting unit 17 and the reference-range setting unit 18.

The candidate-edge detecting unit 17 detects contour-candidate edge positions on the basis of the gradient magnitude of each pixel. The candidate-edge detecting unit 17 includes, as illustrated in FIG. 3, a gradient-change-direction detecting unit 171 and a convex-position detecting unit 172. The gradient-change-direction detecting unit 171 is connected to the convex-position detecting unit 172.

The gradient-change-direction detecting unit 171 detects a gradient change direction of each pixel on the basis of the gradient magnitude of each pixel input from the gradient-magnitude calculating unit 16. The detected gradient change direction of each pixel is output to the convex-position detecting unit 172. The convex-position detecting unit 172 detects positions, at each of which a gradient magnitude of a pixel is greater than a gradient magnitude of adjacent pixels arranged in a gradient direction, i.e., positions that are convex (convex positions). The candidate-edge detecting unit 17 structured as above outputs, as the contour-candidate edge positions, the convex positions detected by the convex-position detecting unit 172 to the contour-edge selecting unit 19.

The reference-range setting unit 18 sets reference ranges that are to be referred to when the contour-edge selecting unit 19 selects a contour edge position from the contour-candidate edge positions. The reference-range setting unit 18 includes, as illustrated in FIG. 4, a reference-direction specifying unit 181 and a reference-range acquiring unit 182. The reference-direction specifying unit 181 is connected to the reference-range acquiring unit 182.

The reference-direction specifying unit 181 specifies directions (reference directions) used for specifying the reference ranges. The specified reference directions are output to the reference-range acquiring unit 182 together with the gradient magnitude of each pixel input from the gradient-magnitude calculating unit 16. The reference-range acquiring unit 182 acquires reference ranges for each of the input reference directions on the basis of the input gradient magnitude of each pixel. The reference-range acquiring unit 182 includes a gradient-magnitude thresholding unit 183. The gradient-magnitude thresholding unit 183 performs thresholding on corresponding directional components of the gradient magnitudes in accordance with each reference direction. The reference-range setting unit 18 structured as above outputs the reference ranges for each reference direction to the contour-edge selecting unit 19.

The contour-edge selecting unit 19 selects a contour edge position from among the contour-candidate edge positions. The contour-edge selecting unit 19 includes, as illustrated in FIG. 5, an edge-characteristic acquiring unit 191 and an edge-characteristic comparing unit 192. The edge-characteristic acquiring unit 191 is connected to the edge-characteristic comparing unit 192.

The edge-characteristic acquiring unit 191 acquires, as edge characteristics of contour-candidate edge positions on each contour-candidate edge line, a value of the greatest gradient magnitude for each continuous contour-candidate edge line on the basis of the contour-candidate edge positions input from the candidate-edge detecting unit 17. The acquired edge characteristics of the respective contour-candidate edge positions are output to the edge-characteristic comparing unit 192 together with the reference ranges for each reference direction input from the reference-range setting unit 18.

The edge-characteristic comparing unit 192 compares the edge characteristics of the respective contour-candidate edge positions with one another in each reference range on the basis of the input reference ranges for each reference direction and on the basis of the input edge characteristics of the respective contour-candidate edge positions, so that a contour edge position is selected in each reference range. The edge-characteristic comparing unit 192 includes a directional-component contour-edge selecting unit 193 and a directional-component contour-edge integrating unit 194. The directional-component contour-edge selecting unit 193 selects a contour edge position in each of the reference ranges for each reference direction. The contour edge position, which has been selected in each of the reference ranges for each reference direction, is output to the directional-component contour-edge integrating unit 194. The directional-component contour-edge integrating unit 194 integrates the contour edge positions, which are input with respect to each reference range in each reference direction, so that a final contour edge position is acquired. The contour-edge selecting unit 19 structured as above outputs a contour edge image, in which the contour edge position is set, to the recording unit 14 for example for storing the contour edge image.

The control unit 20 is realized by hardware, such as a CPU. The control unit 20 sends instructions or data to the units included in the image processing apparatus 1, on the basis of image data acquired via the external I/F unit 11, an operating signal input from the operating unit 12, or computer programs and data recorded in the recording unit 14, thereby integrally controlling the whole operation of the image processing apparatus 1.

Figure 6:
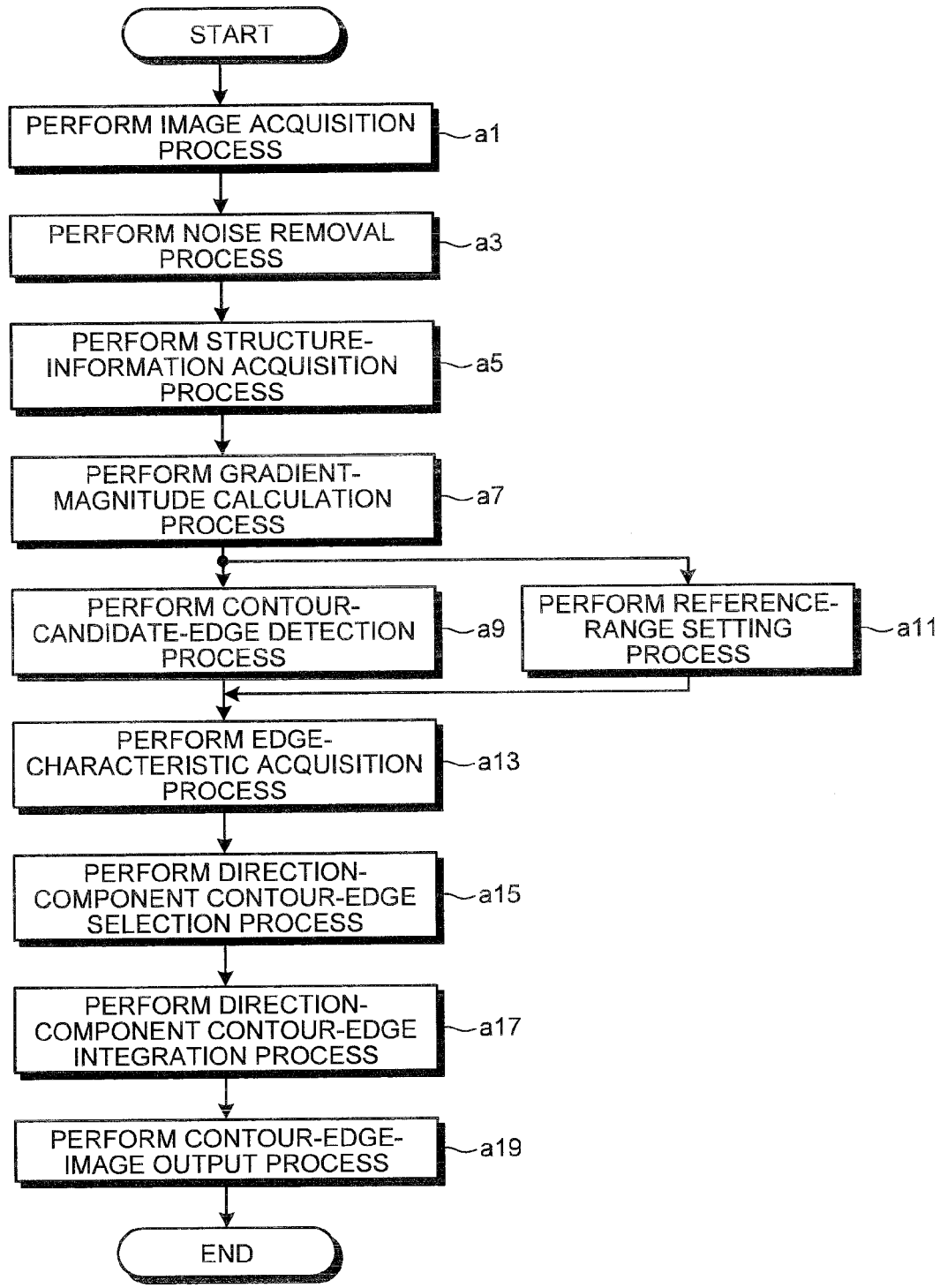
FIG. 6 is an overall flowchart of a procedure of processes performed by the image processing apparatus according to the first embodiment.

FIG. 6 is an overall flowchart of a procedure of processes performed by the image processing apparatus 1 according to the first embodiment. The processing explained below is implemented by causing the units of the image processing apparatus 1 to operate in accordance with the image processing program 141 recorded in the recording unit 14.

Figure 7:
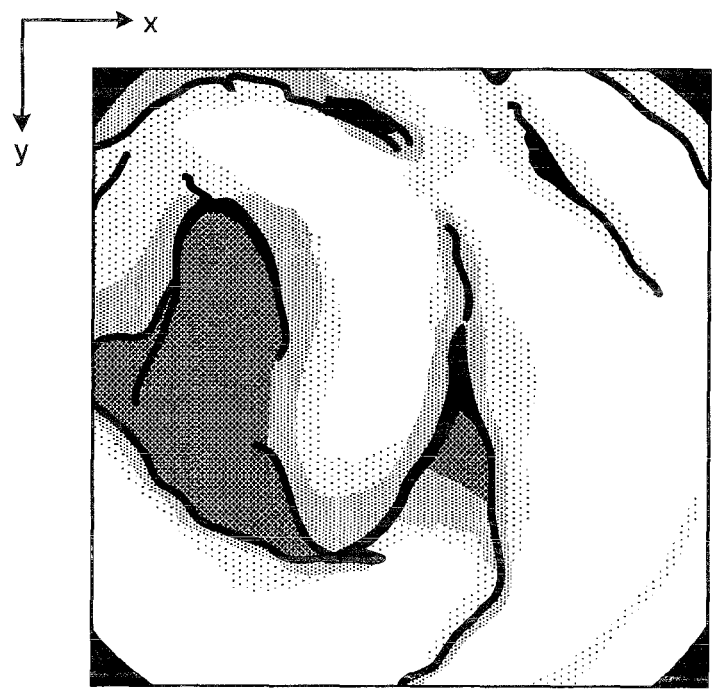
FIG. 7 is an example of an intraluminal image.

As illustrated in FIG. 6, the control unit 20 performs image acquisition process to acquire an intraluminal image as a processing object (Step a1). In this processing, image data of the intraluminal image is acquired via the external I/F unit 11 and recorded in the recording unit 14. After being acquired in the above manner, the image data of the intraluminal image becomes readable by the calculation unit 15. FIG. 7 is an example of the intraluminal image. In the following, a lateral coordinate of a pixel is represented by x and a longitudinal coordinate of the pixel is represented by y on the assumption that an upper left corner of the intraluminal image is the origin of coordinates.

In the calculation unit 15, the noise removing unit 161 of the gradient-magnitude calculating unit 16 performs noise removal process to remove noise from the intraluminal image (Step a3). The noise removal process can be implemented by performing, for example, edge-preserving smoothing processing on the image data of the intraluminal image acquired at Step a1. In this example, the smoothing processing is performed by using, for example, a median filter that is useful for dealing with spike noise. This is because the intraluminal image may contain an area, in which illumination light has been regularly reflected (a regular-reflection area), as a noise area corresponding to spike noise. A filter size is, for example, 11×11. The intraluminal image contains not only a contour edge of a mucosal structure but also irregularities due to tiny projections (villi) or edges (noise edges) due to a regular reflection area that is caused by illumination light. With the noise removal process at Step a3, it is possible to suppress the above-mentioned noise edges, enabling to reduce error detection of a contour edge. The smoothing processing may be performed by using other edge-preserving filters, such as a k-nearest neighbor averaging filter or a bilateral filter, instead of the median filter.

The structure-information acquiring unit 162 performs structure-information acquisition process to acquire shape change information on a surface of a mucosal structure on the basis of the image data of the intraluminal image that has been subjected to the noise removal process at Step a3 (Step a5). Hemoglobin, as a component of a blood vessel or a bleeding site that appears in the intraluminal image, has the property of absorbing a large amount of light in a short wavelength range. Because hemoglobin has the light absorption characteristics in the short wavelength range, luminance values of G (green) components and B (blue) components of which wavelength components are mostly in the short wavelength range are reduced due to light absorption by hemoglobin. Therefore, a blood vessel and a bleeding site may appear as noise edges in the intraluminal image. Meanwhile, R (red) components of which wavelength components are mostly in a long wavelength range absorb only a small amount of light and reflect most of light. Therefore, it is possible to obtain information that most reflects a mucosal structure from the R (red) components. In view of the above, according to the first embodiment, to detect a contour edge of a mucosal structure with high precision in the subsequent processing, image data of an image of an R (red) wavelength component (an R component) (hereinafter, described as an R component image, i.e., an image in which pixel values of each pixel are represented as values of R (red) components) is acquired as the shape change information on the surface of a mucosal structure. With the structure-information acquisition process at Step a5, it is possible to reduce the frequency of a situation in which a noise edge that appears due to change in a color of a surface of a mucous membrane is erroneously detected as a contour edge.

Figure 8:
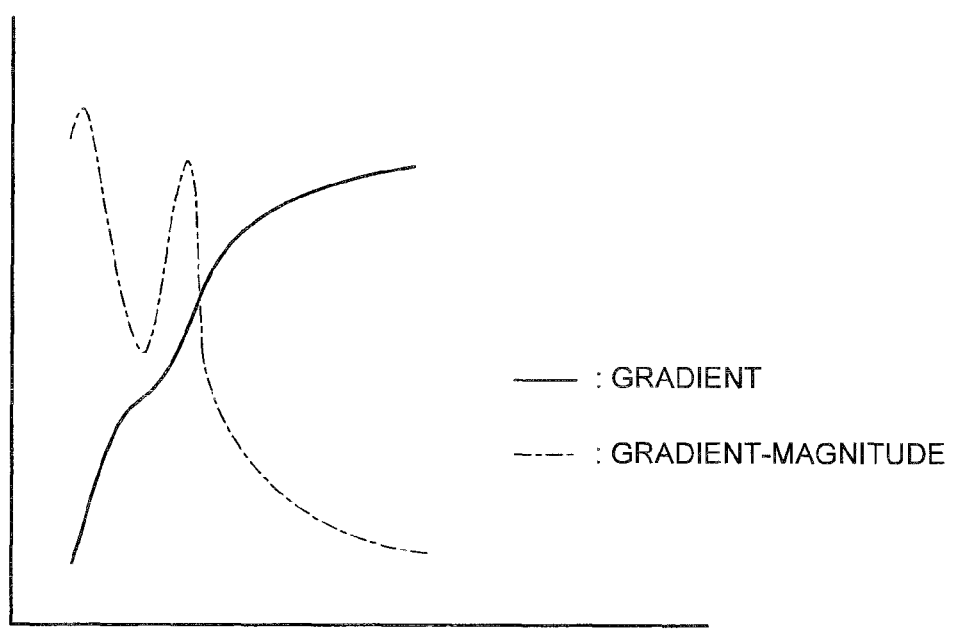
FIG. 8 is a diagram illustrating a relationship between a gradient and a gradient magnitude.

The differential processing unit 163 performs gradient-magnitude calculation process to calculate a (signed) gradient magnitude of each pixel (Step a7). FIG. 8 is a diagram illustrating a relationship between a gradient and a gradient magnitude. In FIG. 8, assuming that a lateral axis represents a pixel position (a coordinate) in a lateral direction (an x direction) in the intraluminal image, a change curve of a gradient is indicated by a bold line with a gradient of each pixel on a vertical axis and a change curve of a gradient magnitude is indicated by a chain line with a gradient magnitude of each pixel on the vertical axis. As illustrated in FIG. 8, values of the gradient magnitudes are large when gradients of pixel values steeply vary and the values of the gradient magnitudes are small when the gradients gently vary. In the gradient-magnitude calculation process at Step a7, the values of the gradient magnitudes are calculated on the basis of the shape change information on the surface of the mucosal structure (the image data of the R component image) acquired at Step a5. In the processing at Step a9 or later, a contour edge position is detected on the basis of the values of the gradient magnitudes. Because the gradient-magnitude calculation process is performed before the processing at Step a9, it is not necessary to calculate the gradient magnitudes in the subsequent processing.

For example, the differential processing unit 163 can perform the gradient-magnitude calculation process by performing differential filter processing using a first-order differential filter on the shape change information on the surface of the mucosal structure (the image data of the R component image) acquired at Step a5. In this example, a sobel filter is applied in order to obtain a gradient magnitude image (an image in which pixel values of all pixels are represented by values of the gradient magnitudes), a lateral-component gradient magnitude image (an image in which pixel values of all pixels are represented by values of lateral components of the gradient magnitudes), and a longitudinal-component gradient magnitude image (an image in which pixel values of all pixels are represented by values of longitudinal components of the gradient magnitudes).

Figures 9A, 9B, 10:
FIG. 9A illustrates a sobel filter for a lateral direction.
FIG. 9B illustrates a sobel filter for a longitudinal direction.
FIG. 10 is an example of a lateral-component gradient magnitude image.
Figure 11:
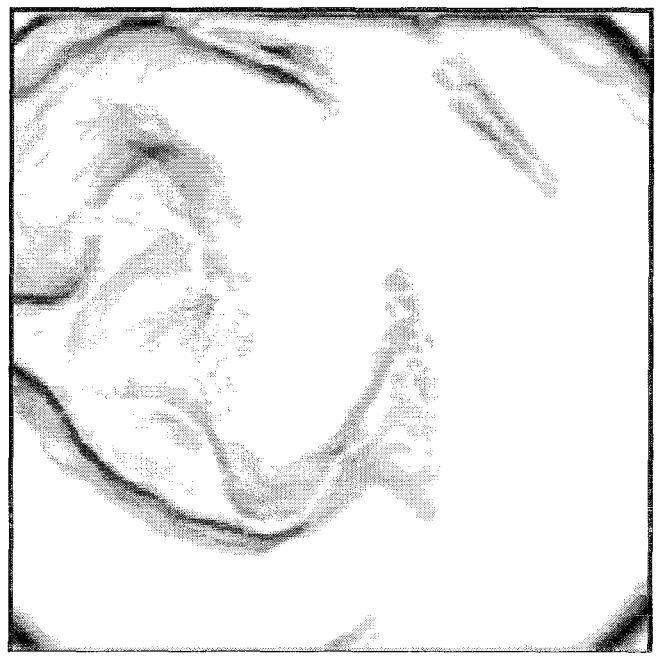
FIG. 11 is an example of a longitudinal-component gradient magnitude image.
Figure 12:
FIG. 12 is an example of a gradient magnitude image.

More specifically, a sobel filter of 3×3 for the lateral direction (the x direction) as illustrated in FIG. 9A and a sobel filter of 3×3 for the longitudinal direction (the y direction) as illustrated in FIG. 9B are applied in order to perform filter processing on a near-field region of 3×3. An output of the differential filter processing, which is performed with the sobel filter for the lateral direction as illustrated in FIG. 9A, is obtained as a lateral component of the gradient magnitude of each pixel. An output of the differential filter processing, which is performed with the sobel filter for the longitudinal direction as illustrated in FIG. 9B, is obtained as a longitudinal component of the gradient magnitude of each pixel. Thereafter, the lateral component and the longitudinal component of the gradient magnitude are combined to obtain the gradient magnitude of each pixel. FIG. 10 is an example of a lateral-component gradient magnitude image that is obtained by processing the intraluminal image illustrated in FIG. 7. FIG. 11 is an example of a longitudinal-component gradient magnitude image that is obtained by processing the intraluminal image illustrated in FIG. 7. FIG. 12 is an example of a gradient magnitude image that is obtained by combining the lateral-component gradient magnitude image illustrated in FIG. 10 and the longitudinal-component gradient magnitude image illustrated in FIG. 11. The differential filter processing may be performed by using other differential filters, instead of the sobel filter.

After the gradient-magnitude calculation process is performed in the above manner, the candidate-edge detecting unit 17 performs contour-candidate-edge detection process as illustrated in FIG. 6 (Step a9). The reference-range setting unit 18 performs reference-range setting process in parallel with the contour-candidate-edge detection process performed at Step a9 (Step a11). By performing the contour-candidate-edge detection process and the reference-range setting process in parallel, it is possible to reduce processing time. However, it is not always necessary to perform the contour-candidate-edge detection process and the reference-range setting process in parallel. It is possible to perform the reference-range setting process after the contour-candidate-edge detection process is complete. It is also possible to perform the reference-range setting process before the contour-candidate-edge detection process is complete. A configuration for performing the reference-range setting process before the contour-candidate-edge detection process is complete will be explained later in a third embodiment.

The contour-candidate-edge detection process performed at Step a9 will be explained below first. In the contour-candidate-edge detection process, the candidate-edge detecting unit 17 detects contour-candidate edge positions, as candidates for a contour edge position, on the basis of the gradient magnitudes of the respective pixels calculated at Step a7. According to the first embodiment, the candidate-edge detecting unit 17 detects, as the contour-candidate edge positions, positions of groups of pixels at the convex positions (ridges).

A process procedure is explained below. The gradient-change-direction detecting unit 171 first calculates a gradient maximum change direction of each pixel in accordance with the following Equation (1) on the basis of the lateral-component gradient magnitude image and the longitudinal-component gradient magnitude image. In the following Equation (1), $f'_x$ represents the lateral-component gradient magnitude image and $f'_y$ represents the longitudinal-component gradient magnitude image. Furthermore, (x, y) represents a coordinate of each pixel in the lateral-component gradient magnitude image and the longitudinal-component gradient magnitude image, and θ represents an angle from the lateral direction of the images.

$$\tan\theta(x, y) = \left(\frac{f'_y(x, y)}{f'_x(x, y)}\right) \quad (1)$$

Figure 13:
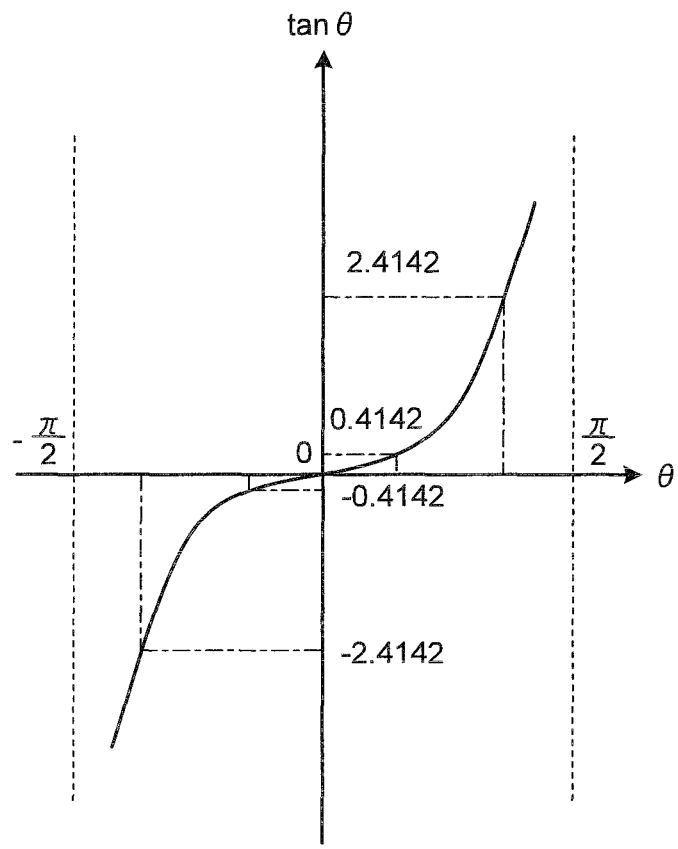
FIG. 13 is a diagram explaining how a tangent in a maximum gradient change direction is converted to a gradient change direction.
Figure 14:
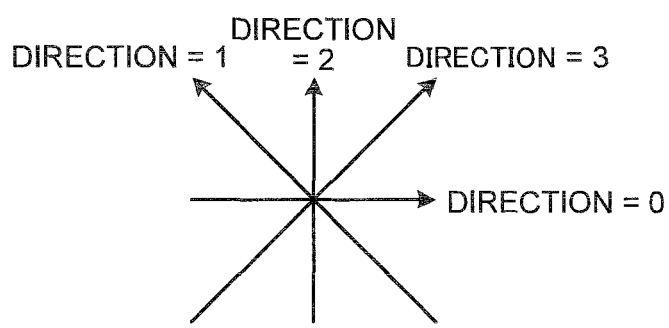
FIG. 14 is a diagram illustrating an example of the gradient change directions.

The gradient-change-direction detecting unit 171 then detects a gradient change direction of each pixel on the basis of the calculated maximum change direction. Because image data is structured such that data (pixel value) is set to each of pixels (coordinates) that are arranged in a matrix form. Therefore, in this example, the gradient change direction of each pixel is detected by classifying the gradient maximum change direction, which has been calculated according to the above Expression (1), as one of 4 directions. FIG. 13 is a diagram explaining how a tangent (tan θ) in the gradient maximum change direction is converted to a gradient change direction. FIG. 14 is a diagram illustrating the four gradient change directions for the classification. As illustrated in FIG. 13, values of tan θ are separated by values of "−2.4142", "−0.4142", "0.4142", and "2.4142", and the gradient change direction of each pixel is classified as one of Directions=0, 1, 2, and 3 as illustrated in FIG. 14, depending on a range to which the value of tanθ, which has been calculated as the gradient maximum change direction in accordance with the above Equation (1), belongs.

Figure 15A:
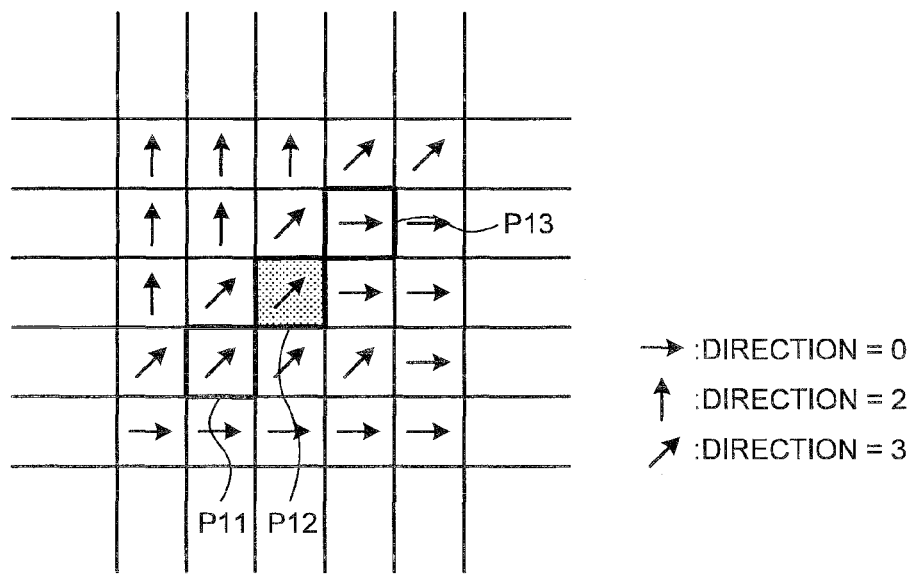
FIG. 15A is a diagram explaining a principle of detection of a convex position.
Figure 15B:
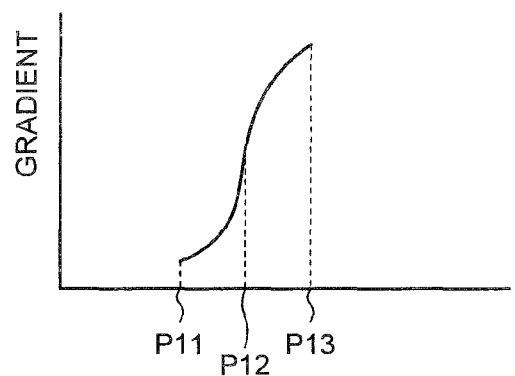
FIG. 15B is another diagram explaining the principle of detection of the convex position.
Figure 15C:
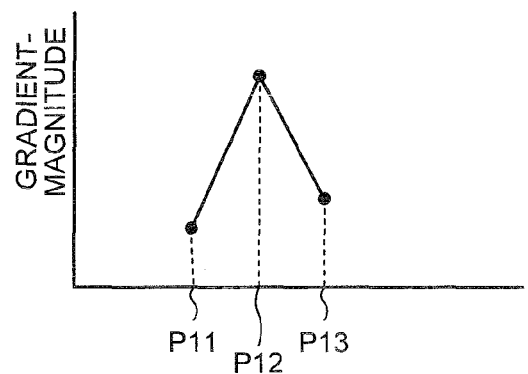
FIG. 15C is still another diagram explaining the principle of detection of the convex position.

Thereafter, the convex-position detecting unit 172 detects a convex position of the gradient magnitudes on the basis of the gradient change direction of each pixel. FIG. 15A is a diagram illustrating an example of the gradient change direction of each pixel detected at the preceding processing. In FIG. 15A, the gradient change directions of the respective pixels are indicated by arrows. FIG. 15B is a diagram illustrating a change between gradients of pixels P11 to P13 illustrated in FIG. 15A. FIG. 15C is a diagram illustrating a change between gradient magnitudes of the pixels P11 to P13 illustrated in FIG. 15A.

The convex position is detected by determining whether a value of the gradient magnitude of a pixel-of-interest is greater than gradient magnitudes of other pixels that are adjacent to the pixel-of-interest in the gradient change direction. For example, as illustrated in FIG. 15A, the pixels P11 to P13 are adjacent to one another along the gradient change direction (Direction=3) at the position of the pixel-of-interest P12. When a change between the gradients of the pixels P11 to P13 is steep at the pixel P12 as illustrated in FIG. 15B, the value of the gradient magnitude of the pixel P12 is the greatest as illustrated in FIG. 15C and the change is represented as a convex at the pixel P12. In this case, the pixel P12 is detected as the convex position.

In actual processing, all of the pixels are sequentially handled as a pixel-of-interest(x, y), and a value of a gradient magnitude of the pixel-of-interest (x, y) is compared with values of gradient magnitudes of adjacent pixels that are arranged on the both sides of the pixel-of-interest in the gradient change direction. When the gradient magnitude of the pixel-of-interest(x, y) is the greatest, the pixel-of-interest (x, y) is detected as the convex position.

Figure 16A:
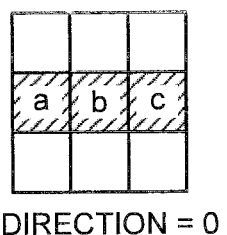
FIG. 16A is a diagram explaining pixels of which gradient magnitudes are compared with each other when a gradient change direction of a pixel-of-interest is set so that Direction=0.
Figure 16B:
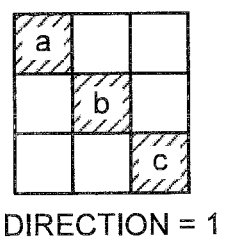
FIG. 16B is a diagram explaining pixels of which gradient magnitudes are compared with each other when the gradient change direction of the pixel-of-interest is set so that Direction=1.
Figure 16C:
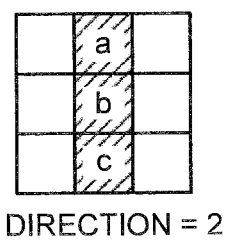
FIG. 16C is a diagram explaining pixels of which gradient magnitudes are compared with each other when the gradient change direction of the pixel-of-interest is set so that Direction=2.
Figure 16D:
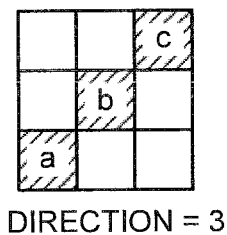
FIG. 16D is a diagram explaining pixels of which gradient magnitudes are compared with each other when the gradient change direction of the pixel-of-interest is set so that Direction=3.

FIG. 16A is a diagram explaining pixels of which gradient magnitudes are compared with each other when a gradient change direction of a pixel-of-interest is set so that Direction=0. FIG. 16B is a diagram explaining pixels of which gradient magnitudes are compared with each other when the gradient change direction of the pixel-of-interest is set so that Direction=1. FIG. 16C is a diagram explaining pixels of which gradient magnitudes are compared with each other when the gradient change direction of the pixel-of-interest is set so that Direction=2. FIG. 16D is a diagram explaining pixels of which gradient magnitudes are compared with each other when the gradient change direction of the pixel-of-interest is set so that Direction=3. To distinguish the pixel-of-interest from pixels, which are arranged on the both sides of the pixel-of-interest and are used for comparing the gradient magnitudes, the pixel-of-interest is denoted by b and the pixels on the both sides are denoted by a and c as indicated in respective cells in the figures.

For example, when the gradient change direction of the pixel b being the pixel-of-interest(x, y) is set so that Direction=0, the gradient magnitude is compared with those of the pixels a and c on the both adjacent sides in the horizontal direction, i.e., Direction=0, as illustrated in FIG. 16A. When Direction=1, 2, or 3 as illustrated in FIG. 16B, 16C, or 16D, the comparison is performed in the same manner. More specifically, according to the following Equations (2) and (3), when the gradient magnitude of the pixel b being the pixel-of-interest(x, y) is greater than those of any other pixels a and c, i.e., the greatest, the pixel-of-interest(x, y) is detected as the convex portion, and a value of Line(x, y) is set to the gradient magnitude f'(x, y). On the other hand, when the gradient magnitude of the pixel b is not the greatest, the value of Line(x, y) is set to "0".

When a pixel b has the greatest gradient magnitude, $$\text{Line}(x,y) = f'(x,y) \quad (2)$$

$$\text{Other than the above, Line}(x,y) = 0 \quad (3)$$

Figure 17:
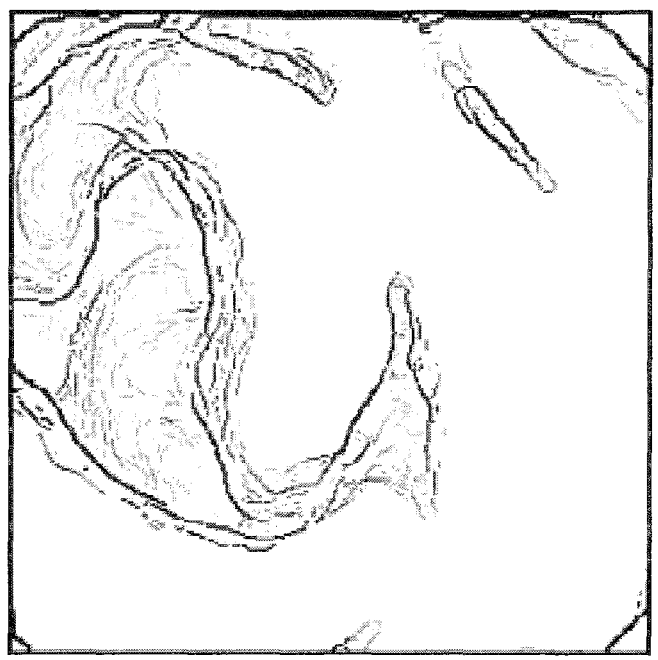
FIG. 17 is an example of a contour-candidate edge image.

The above processing is performed on all of the pixels, so that a contour-candidate edge image is obtained in which a pixel value of each pixel is represented as the value Line(x, y), that is, in which pixel values at the convex positions are set to the value of the gradient magnitude and pixel values of pixels at positions other than the convex positions are set to "0". FIG. 17 illustrates a contour-candidate edge image that is obtained by processing the lateral-component gradient magnitude image illustrated in FIG. 10, the longitudinal-component gradient magnitude image illustrated in FIG. 11, and the gradient magnitude image illustrated in FIG. 12.

Next, the reference-range setting process performed at Step a11 will be explained below. In the reference-range setting process, the reference-range setting unit 18 sets a range (a reference range) for selecting a contour edge position, on the basis of the gradient magnitude of each pixel calculated at Step a7.

A process procedure is explained below. The reference-direction specifying unit 181 first specifies reference directions. According to the first embodiment, two directions, i.e., the lateral direction and the longitudinal direction, along which the directional components of the gradient magnitude are calculated, are specified as the reference directions.

The reference-range acquiring unit 182 performs segmentation (partitioning) to assign an area to each pixel from among one or more areas including an upward gradient area or a downward gradient area, with respect to each reference direction. Accordingly, reference ranges are obtained with respect to each reference direction. According to the first embodiment, a reference range is assigned to each pixel from among one or more reference ranges with respect to each of the lateral direction and the longitudinal direction that are the reference directions. More specifically, the gradient-magnitude thresholding unit 183 of the reference-range acquiring unit 182 performs thresholding on the lateral-component gradient magnitude image in accordance with the following Equations (4), (5), and (6) so that the lateral-component gradient magnitude image is segmented into three areas, i.e., an upward gradient area, a downward gradient area, and a flat area.

$$\text{Field}_x(x,y) = 0 \, (0: \text{flat}) \text{ if } -5 \leq f'_x(x,y) \leq 5 \quad (4)$$

$$\text{Field}_x(x,y) = 1 \, (1: \text{upward gradient}) \text{ if } f'_x(x,y) > 5 \quad (5)$$

$$\text{Field}_x(x,y) = 2 \, (2: \text{downward gradient}) \text{ if } f'_x(x,y) < -5 \quad (6)$$

Figure 18:
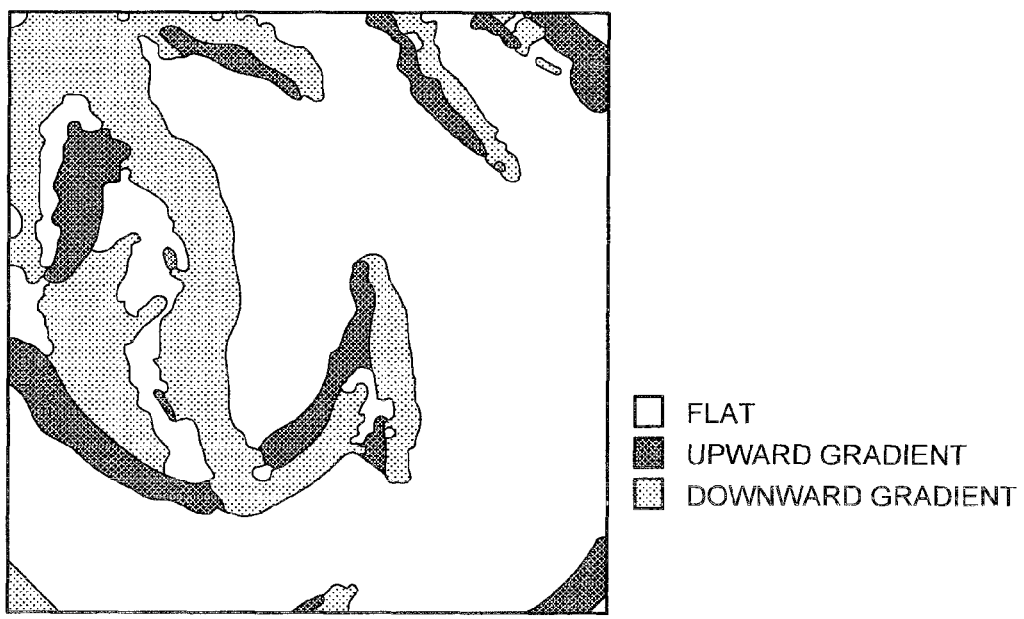
FIG. 18 is an example of a lateral-reference-range segmented image.

To add some margins to the reference range, the reference-range acquiring unit 182 performs known morphological closing processing and opening processing on the segmented upward gradient area and the segmented downward gradient area. Accordingly, the upward gradient area and the downward gradient area are enhanced and set as the reference ranges in the lateral direction. FIG. 18 illustrates a lateral-reference-range segmented image that is obtained by processing the lateral-component gradient magnitude image illustrated in FIG. 10.

The reference-range acquiring unit 182 also performs segmentation to assign a reference range to each pixel from among one or more reference ranges, on the basis of the longitudinal-component gradient magnitude image and in the same manner as in the case for the lateral direction. More specifically, the gradient-magnitude thresholding unit 183 performs thresholding on the longitudinal-component gradient magnitude image according to the following Equation (7), (8), and (9) so that the longitudinal-component gradient magnitude image is segmented into three areas, i.e., an upward gradient area, a downward gradient area, and a flat area.

$$\text{Field}_y(x,y)=0(0:\text{flat}) \text{ if } -5 < f'_y(x,y) < 5 \tag{7}$$

$$\text{Field}_y(x,y)=1(1:\text{upward gradient}) \text{ if } f'_y(x,y) > 5 \tag{8}$$

$$\text{Field}_y(x,y)=2(2:\text{downward gradient}) \text{ if } f'_y(x,y) < -5 \tag{9}$$

Figure 19:
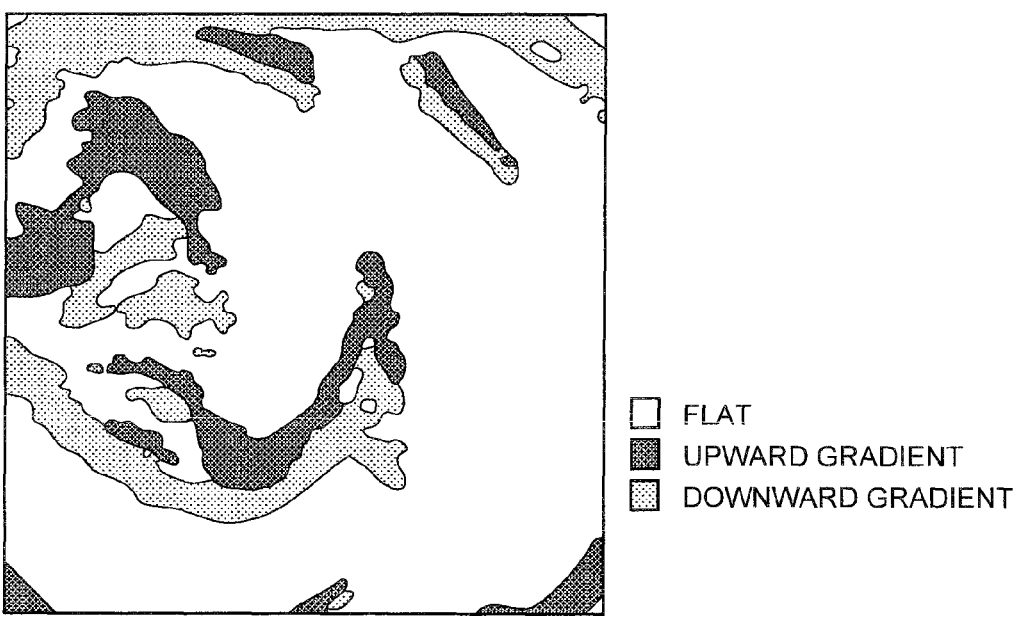
FIG. 19 is an example of a longitudinal-reference-range segmented image.

Thereafter, the reference-range acquiring unit 182 performs morphological closing processing and opening processing on the segmented upward gradient area and the segmented downward gradient area. Accordingly, the upward gradient area and the downward gradient area are enhanced and set as the reference range in the longitudinal direction. FIG. 19 illustrates a longitudinal-reference-range segmented image that is obtained by processing the longitudinal-component gradient magnitude image illustrated in FIG. 11.

By performing the reference-range setting process as described above, it is possible to adaptively set a range (a reference range), in which one contour edge position is to be selected in the subsequent processing, depending on the gradient magnitude of each pixel. Therefore, in the subsequent processing, it is possible to properly select one contour edge position from the contour-candidate edge positions with respect to each gradient (with respect to each of the upward gradient area and the downward gradient area). As a result, it is possible to improve the detection accuracy of the contour edge position.

As illustrated in FIG. 6, the edge-characteristic acquiring unit 191 of the contour-edge selecting unit 19 performs edge-characteristic acquisition process to acquire an edge characteristic of each contour-candidate edge position detected at Step a9 (Step a13). FIG. 20(*a*) is a schematic diagram of an example of the contour-candidate edge positions. In FIG. 20(*a*), three contour-candidate edge lines EL21, EL22, and EL23 are illustrated. FIG. 20(*b*) illustrates a change curve of a gradient magnitude on the contour-candidate edge line EL22 in FIG. 20(*a*) on the assumption that a lateral axis represents a coordinate (x, y) on the contour-candidate edge line EL22 in FIG. 20(*a*) and a longitudinal axis represents a value of a gradient magnitude of each pixel. As illustrated in FIG. 20(*b*), a value of a gradient magnitude at a contour-candidate edge position P2 in FIG. 20(*a*) is the greatest on the contour-candidate edge line EL22. According to the first embodiment, this maximum value of the gradient magnitude is used as the edge characteristic of the contour-candidate edge line EL22, and values of gradient magnitudes of all of the contour-candidate edge positions on the contour-candidate edge line EL22 are replaced with the value of the gradient magnitude at the contour-candidate edge position P2 as indicated by chain arrows in FIG. 20(*a*). While the contour-candidate edge line EL22 is explained as an example, edge characteristics of the contour-candidate edge lines EL21 and EL23 are acquired in the same manner.

Figure 21:
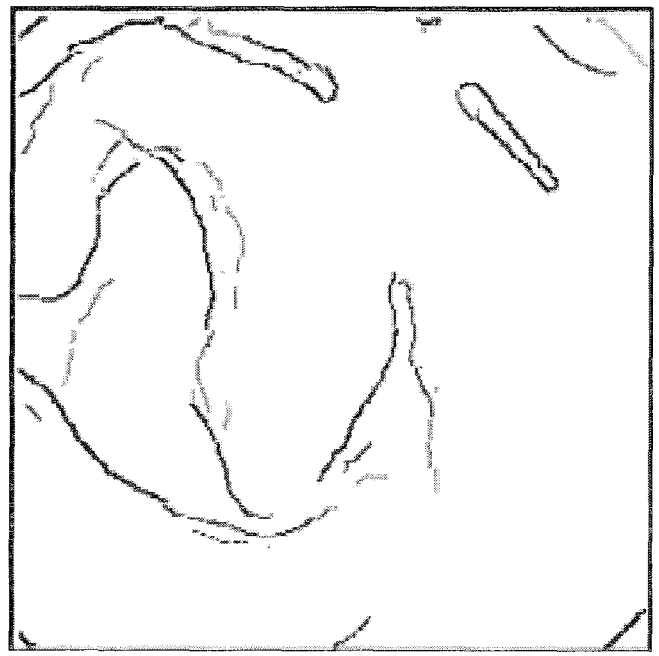
FIG. 21 is an example of an edge characteristic image.

The above processing is performed on all of the contour-candidate edge lines, and pixel values of all contour-candidate edge positions are set to the value of the edge characteristic that is acquired for a contour-candidate edge line containing the contour-candidate edge positions (i.e., set to the maximum value of a gradient magnitude at a contour-candidate edge position on the contour-candidate edge line). When the maximum value of the gradient magnitude at the contour-candidate edge position on the contour-candidate edge line is equal to or greater than a predetermined threshold, the values of the gradient magnitudes of all of the contour-candidate edge positions on the contour-candidate edge line are replaced with the maximum value. On the other hand, when the maximum value is equal to or smaller than the predetermined threshold, the values of the gradient magnitudes of all of the contour-candidate edge positions on the contour-candidate edge line are replaced with 0 and these positions are excluded from the contour candidate edge. As a result, the edge characteristic image is obtained. FIG. 21 illustrates an edge characteristic image that is obtained by processing the gradient magnitude image illustrated in FIG. 12.

In directional-component contour-edge selection process in the subsequent stage (Step a15), a contour edge position is selected from the contour-candidate edge positions in each reference range. In this case, a contour-candidate edge position, at which the value of the gradient magnitude (i.e., the edge characteristic) is the greatest among the contour-candidate edge positions on the contour-candidate edge line containing these contour-candidate edge positions, is selected as the contour edge position from among the contour-candidate edge positions in each reference range. By performing the edge-characteristic acquisition process and setting an edge characteristic to each contour-candidate edge position before performing the directional-component contour-edge selection process, it is not necessary to repeatedly acquire an edge characteristic every time the reference range is changed in the directional-component contour-edge selection process. Therefore, it is possible to reduce processing time.

In this example, the maximum value of the gradient magnitude at a contour-candidate edge position on the contour-candidate edge line is used as an edge characteristic. However, the present invention is not limited to this example. For example, it is possible to use, as the edge characteristic, an average of the gradient magnitudes of the contour-candidate edge positions on the contour-candidate edge line. When the maximum value of the gradient magnitude is used as the edge characteristic as described above, it may be possible that any edge characteristic, which is obtained when values of gradient magnitudes of some contour-candidate edge positions on the contour-candidate edge line are increased due to noise or the like, becomes greater than an edge characteristic corresponding to the gradient magnitude that is large for the whole contour-candidate edge line. By contrast, when the average of the gradient magnitudes is used as the edge characteristic, it is possible to use, as an edge characteristic, an averaged gradient magnitude for the contour-candidate edge positions on the contour-candidate edge line. Therefore, it is possible to reduce influence of noise. As a result, it is possible to set more appropriate value as the edge characteristic. Meanwhile, it is also possible to use, as the edge characteristic, a length of the contour-candidate edge line or the degree of smoothness of the contour-candidate edge line.

Figure 22:
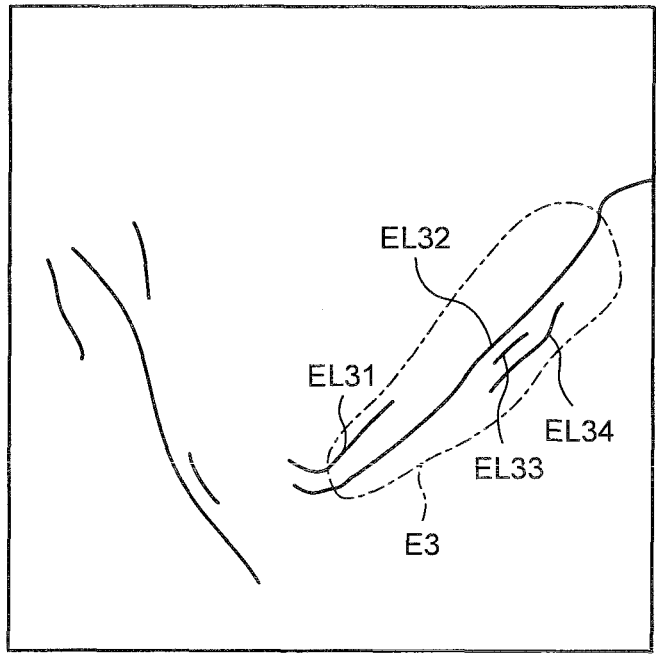
FIG. 22 is a diagram explaining a principle of selection of a contour edge position.

As illustrated in FIG. 6, the directional-component contour-edge selecting unit 193 of the edge-characteristic comparing unit 192 performs directional-component contour-edge selection process (Step a15). In the directional-component contour-edge selection process, processing of selecting a contour edge position from among the contour-candidate edge positions in each reference range set at Step a11 is performed with respect to each reference direction. FIG. 22 is a diagram explaining a principle of selection of a contour edge position. In FIG. 22, it is assumed that an area enclosed by a chain line is one segmented reference range E3 (an upward gradient area or a downward gradient area). The reference range E3 contains a part or all of contour-candidate edge positions that form four contour-candidate edge lines EL31 to EL34. It is assumed that an edge characteristic of the contour-candidate edge line EL32 is the greatest among those of the four contour-candidate edge lines E31 to E34. In this case, a contour-candidate edge position on the contour-candidate edge line EL32 contained in the reference range E3 is selected as the contour edge position in the reference range E3.

A process procedure is explained below. First, a lateral-component contour edge position is selected from an edge characteristic image on the basis of a reference-range segmented image with respect to the lateral direction that is one of the reference directions. More specifically, processing of referring to the edge characteristic image for each reference range in the lateral direction and selecting one contour-candidate edge position from each reference range is performed with respect to each line in the lateral direction (the y direction), so that the lateral-component contour edge position is obtained.

Figure 23:
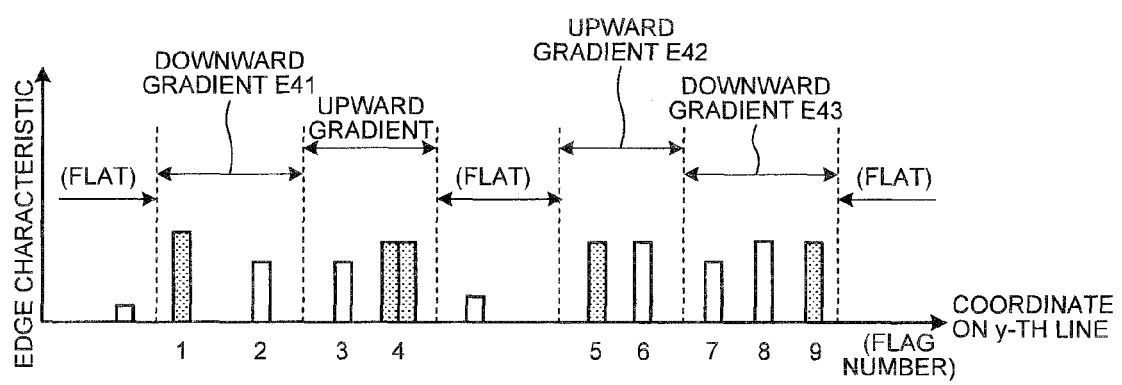
FIG. 23 is a diagram explaining a principle of selection of a lateral-component contour edge position.

FIG. 23 is a diagram explaining a principle of selection of the lateral-component contour edge position. In the figure, values of edge characteristics of respective pixels on the y-th line are illustrated. When the y-th line of the edge characteristic image is focused on, a flag number is assigned to each contour-candidate edge position in upward gradient reference ranges and downward gradient reference ranges in accordance with segmentation positions of the reference ranges on the y-th line as segmented by dashed lines in FIG. 23. At this time, adjacent contour-candidate edge positions are considered as one contour-candidate edge position and are assigned with one flag number as assigned with "4" in FIG. 23. The processing at this time is performed for detecting a contour edge in an intraluminal image, and therefore, the processing is not performed on a reference range corresponding to a flat area.

Subsequently, on the assumption that the edge position detected from one gradient (one reference range) is a position at which a change in luminance that occurs due to a gradient (a gradient magnitude) is the greatest, a contour-candidate edge position having the maximum value of the edge characteristic is selected. More specifically, the upward gradient reference ranges and the downward gradient reference ranges are sequentially handled as a selection object, and edge characteristics with respective flag numbers are compared with one another in a reference range being the selection object. Then, a contour-candidate edge position with the flag number that corresponds to the maximum value of the edge characteristic is selected as a lateral-component contour edge position in the reference range being the selection object. For example, in a downward gradient reference range E41, a contour-candidate edge position assigned with the flag number "1" is selected as the lateral-component contour edge position. At this time, when the reference range being the selection object contains a plurality of the maximum values of the edge characteristics, any one of the values is selected depending on whether the reference range is the upward gradient reference range or the downward gradient reference range. More specifically, when a plurality of the maximum values of the edge characteristics is contained in one reference range, it is assumed that the contour edge position is a position from which a luminance value is increased due to the gradient. With this assumption, a contour-candidate edge position on the leftmost side is selected in a reference range in which a gradient rises to the right, and a contour-candidate edge position on the rightmost side is selected when the gradient falls to the right. For example, the former position is selected in an upward gradient reference range E42 (a contour-candidate edge position assigned with the flag number "5" on the left side in FIG. 23), and the latter position is selected in a downward gradient reference range E43 (a contour-candidate edge position assigned with the flag number "9" on the right side in FIG. 23). A method of selecting one edge position when a plurality of maximum values of the edge characteristics is present in one reference range is not limited to the above-mentioned method. For example, it is possible to assume that the reliability of a contour candidate edge as a contour edge is increased as the length of the contour candidate edge increases, and select a contour edge candidate position corresponding to the contour candidate edge with a longer length.

Figure 24:
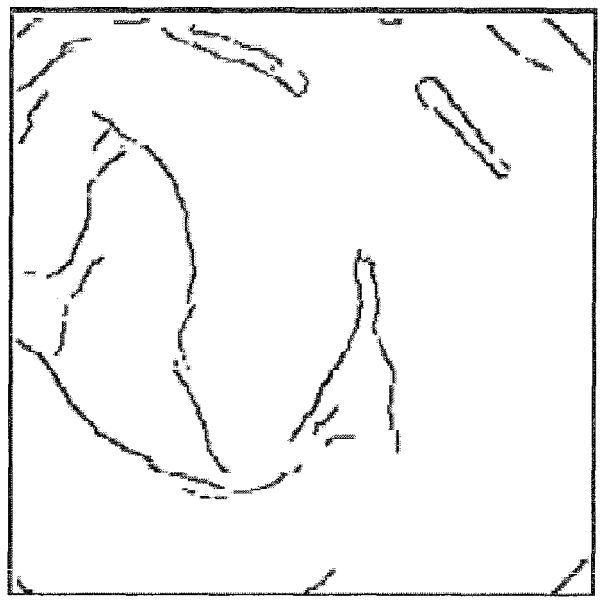
FIG. 24 is an example of a lateral-component contour edge image.

The above-mentioned processing is performed on all lines in the y direction, so that a lateral-component contour edge image is obtained, in which pixel values of pixels determined as the lateral-component contour edge positions are set to, for example, "1" and pixel values of the other pixels are set to "0". FIG. 24 is an example of a lateral-component contour edge image that is obtained by processing the edge characteristic image illustrated in FIG. 21 by reference to the lateral-reference-range segmented image illustrated in FIG. 18.

Figure 25:
FIG. 25 is an example of a longitudinal-component contour edge image.

Subsequently, longitudinal-component contour edge positions are selected from the edge characteristic image on the basis of a reference-range segmented image with respect to the longitudinal direction. More specifically, in the same manner as in the case for the lateral direction, processing of referring to the edge characteristic image for each reference range in the longitudinal direction and selecting one contour-candidate edge position from each reference range is performed with respect to each line in the longitudinal direction (the x direction), so that the longitudinal-component contour edge position is obtained. Then, a longitudinal-component contour edge image is obtained in which pixel values of pixels determined as the longitudinal-component contour edge positions are set to "1" and pixel values of the other pixels are set to "0". FIG. 25 is an example of a longitudinal-component contour edge image that is obtained by processing the edge characteristic image illustrated in FIG. 21 by reference to the longitudinal-reference-range segmented image illustrated in FIG. 19.

In the above example, a contour-candidate edge position at which the edge characteristic is the greatest in a reference range is selected as the contour edge position. However, it is possible to select, as the contour edge position, a contour-candidate edge position on a contour-candidate edge line that is the longest in a reference range among contour-candidate edge lines contained in the reference range. More specifically, the number of pixels on each contour-candidate edge line contained in a reference range being a selection object (the number of contour-candidate edge positions) is counted, and a contour-candidate edge position on a contour-candidate edge line that contains the greatest number of pixels may be selected as the contour edge position in the reference range being the selection object. For example, in the example of FIG. 22, because the contour-candidate edge line EL32 is the longest in the reference range E3, a contour-candidate edge position on the contour-candidate edge line EL32 contained in the reference range E3 is selected as the contour edge position in the reference range E3.

As another option, it is possible to select, as the contour edge position, a contour-candidate edge position on the smoothest contour-candidate edge line among the contour-candidate edge lines contained in a reference range. More specifically, a predetermined number of points are set at regular intervals on each contour-candidate edge line. Then, an absolute value of an outer product of vectors toward horizontally adjacent points is calculated for each of the set points. Thereafter, a variance of the absolute values of the outer products, which have been calculated for the respective points, is calculated. The above processing is performed for all of the contour-candidate edge lines contained in the reference range, and the obtained variances are compared with one another. Then, a contour-candidate edge line with the smallest variance is determined as the smoothest contour-candidate edge line, and a contour-candidate edge position on the smoothest contour-candidate edge line is selected as the contour edge position.

As illustrated in FIG. 6, the directional-component contour-edge integrating unit 194 performs directional-component contour-edge integration process (Step a17). In the directional-component contour-edge integration process, the directional-component contour-edge integrating unit 194 selects highly reliable positions from among the lateral-component contour edge positions and the longitudinal-component contour edge positions, and integrates the selected positions to obtain a contour edge image.

A process procedure is explained below. The directional-component contour-edge integrating unit 194 refers to the lateral-component contour edge image and the longitudinal-component contour edge image for each pixel, and selects, as the contour edge position, a pixel to which "1" is set in both of the images (a pixel that is selected both as the lateral-component contour edge position and the longitudinal-component contour edge position), because such a pixel is highly reliable. In actual processing, according to the following Equations (10) and (11), a pixel value Edge(x, y) of a pixel in the contour edge image is set to "1" when a pixel value edgeA(x, y) of the pixel in the lateral-component contour edge image and a pixel value edgeB(x, y) of the pixel in the longitudinal-component contour edge image are "1". On the other hand, a pixel value Edge(x, y) of a pixel is set to "0" when one of the pixel values of this pixel in the images is "1" or when both of the pixel values of this pixel in the images are $$\text{Edge}(x,y)=1 \text{ if edge}A(x,y)=1 \text{ and edge}B(x,y)=1 \tag{10}$$

$$\text{Edge}(x,y)=0 \text{ otherwise} \tag{11}$$

As described above, according to the first embodiment, to obtain the contour edge position, a direction of laterally crossing a continued peak of luminance values is set as the reference direction, and a position at which the gradient magnitude in the reference direction becomes the greatest is selected as the contour edge position. At this time, the gradient magnitudes correspond to the continued peak of the luminance values, and the contour edge position corresponds to a ridge of the continued peak. In most cases, the direction of laterally crossing the continued peak of the luminance values is perpendicular to the direction of the ridge. However, when the lateral crossing direction is approximately parallel to the direction of the ridge, and if the ridge winds, the same contour candidate edge is contained a plurality of number of times in a reference range, so that a part of the edge may be deleted. Therefore, when the reference direction is the lateral direction and the contour edge is also in the lateral direction, it is assumed that the reliability is low. Similarly, when the reference direction is a longitudinal direction and the contour edge is also in the longitudinal direction, it is assumed that the reliability is low.

That is, it is considered that a longitudinal-component edge in the lateral-component contour edge image is reliable. Therefore, the directional-component contour-edge integrating unit 194 sequentially refers to the pixel values edgeA(x, y) of the respective pixels in the lateral-component contour edge image, sets a position of any longitudinal-component edge as the contour edge position in accordance with the following Equations (12) and (13), and sets a corresponding pixel value Edge(x, y) in the contour edge image to "1".

$$\text{Edge}(x,y)=1 \text{ if condition 1 or 2 is satisfied} \tag{12}$$

$$\text{Edge}(x,y)=0 \text{ otherwise} \tag{13}$$

where
Condition 1: edgeA(x−1, y−1)=0, edgeA(x, y−1)=0, and edgeA(x+1, y−1)=0
Condition 2: edgeA(x−1, y+1)=0, edgeA(x, y+1)=0, and edgeA(x+1, y+1)=0

Similarly, it is considered that a lateral edge in the longitudinal-component edge image is reliable. Therefore, the directional-component contour-edge integrating unit 194 sequentially refers to the pixel values edgeB(x, y) of the respective pixels in the longitudinal-component contour edge image, sets a position of any lateral edge as the contour edge position in accordance with the following Equations (14) and (15), and sets a corresponding pixel value Edge(x, y) in the contour edge image to "1".

$$\text{Edge}(x,y)=1 \text{ if condition 3 or 4 is satisfied} \tag{14}$$

$$\text{Edge}(x,y)=0 \text{ otherwise} \tag{15}$$

where
Condition 3: edgeB(x−1, y−1)=0, edgeB(x−1, y)=0, and edgeB(x−1, y+1)=0
Condition 4: edgeB(x+1, y−1)=0, edgeB(x+1, y)=0, and edgeB(x+1, y+1)=0

Figure 26:
FIG. 26 is an example of a contour edge image.

Thereafter, the calculation unit 15 performs contour-edge-image output process to output the contour edge image, which is obtained as a result of the directional-component contour-edge integration process performed at Step a17, to the recording unit 14 for storing the image (Step a19). FIG. 26 is an example of the contour edge image that is obtained at Step a17 of FIG. 6 by processing the lateral-component contour edge image illustrated in FIG. 24 and the longitudinal-component contour edge image illustrated in FIG. 25 and that is output at Step a19 of FIG. 6.

A contour portion of an elastic body, such as mucosal structure, that appears in an intraluminal image may include a portion where a gentle gradient is present in the middle of one overall gradient. In such a portion, two or more peak positions are separately present in the distribution of gradient magnitudes, so that when a conventional method is used in which a peak position of a distribution of gradient magnitudes (the convex position of the gradient magnitudes detected by the convex-position detecting unit 172) is simply selected as the edge position, a plurality of edge lines may be detected near a contour. By contrast, according to the first embodiment, contour-candidate edge positions are detected on the basis of the gradient magnitude of each pixel in an intraluminal image. Furthermore, reference ranges are set by assigning an area to each pixel from among a plurality of areas including an upward gradient area and a downward gradient area on the basis of the gradient magnitudes, and a contour-candidate edge position is selected as the contour edge position for each of the upward gradient reference range and the downward gradient reference range. Therefore, even when two or more peak positions of the gradient magnitudes are present in a contour portion, it is possible to detect one position that has the greatest edge characteristic (that has the maximum gradient magnitude value) as the contour edge of the mucosal structure. As a result, it is possible to detect the contour edge of the mucosal structure from the intraluminal image with high precision.

Second Embodiment

Figure 27:
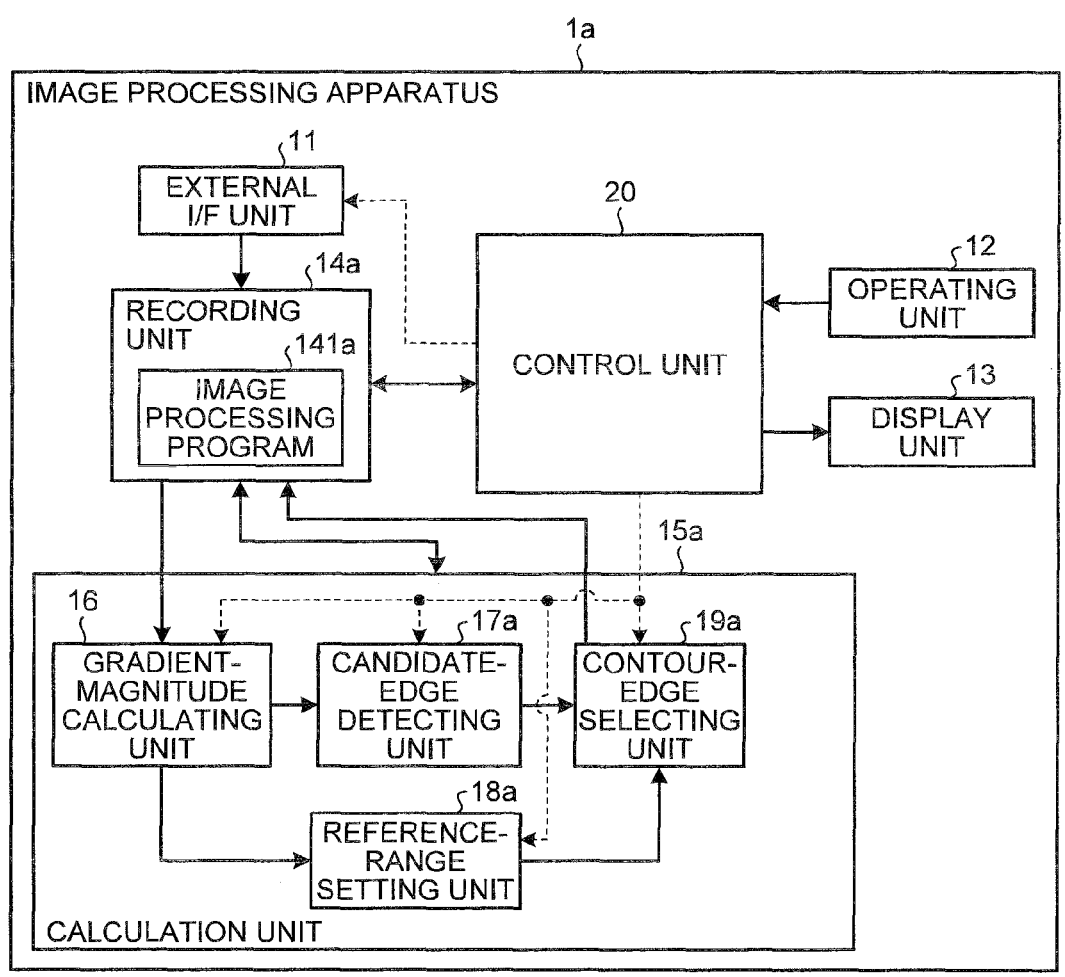
FIG. 27 is a block diagram of a functional configuration example of an image processing apparatus according to a second embodiment.
Figure 28:
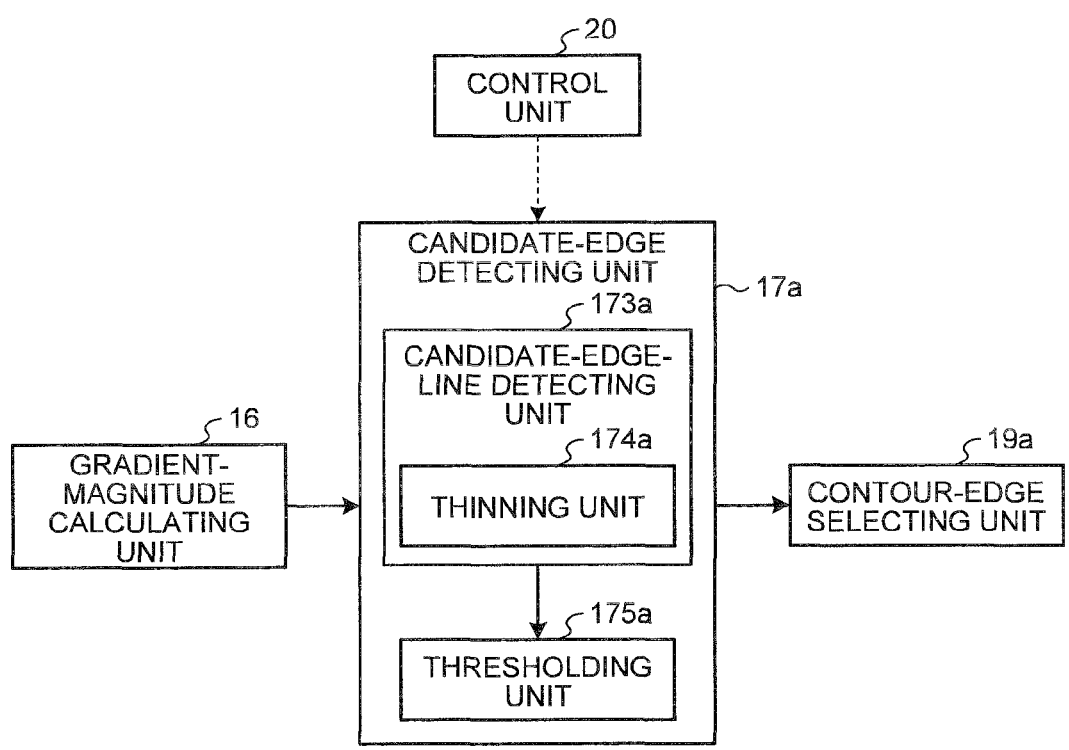
FIG. 28 is a block diagram of a configuration example of a candidate-edge detecting unit according to the second embodiment.
Figure 29:
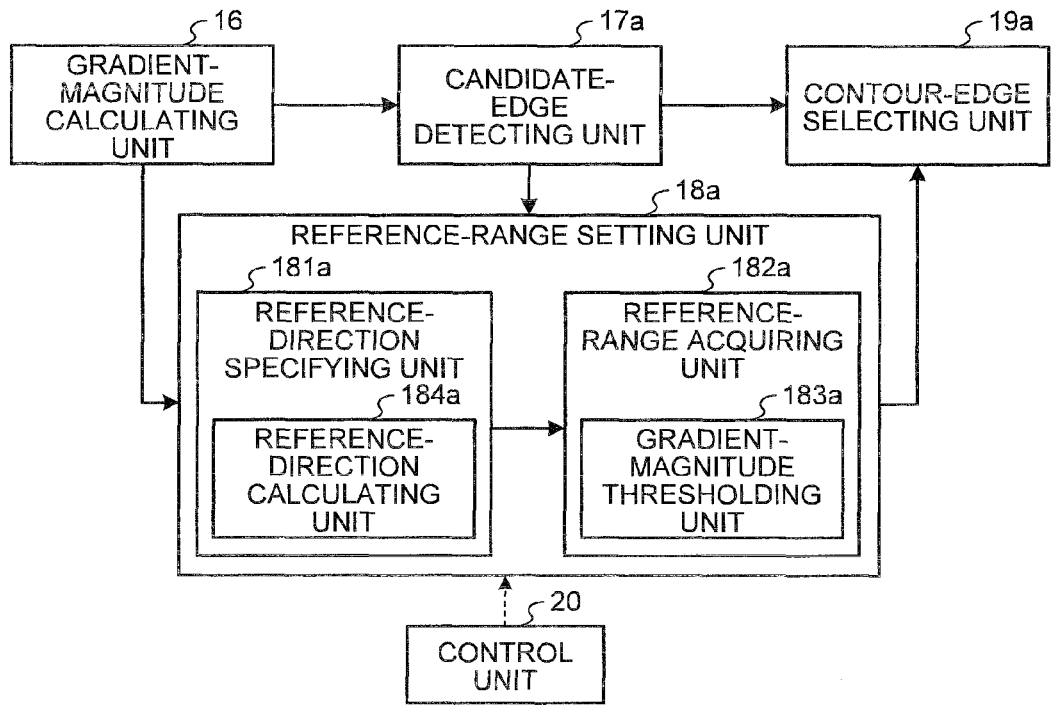
FIG. 29 is a block diagram of a configuration example of a reference-range setting unit according to the second embodiment.
Figure 30:
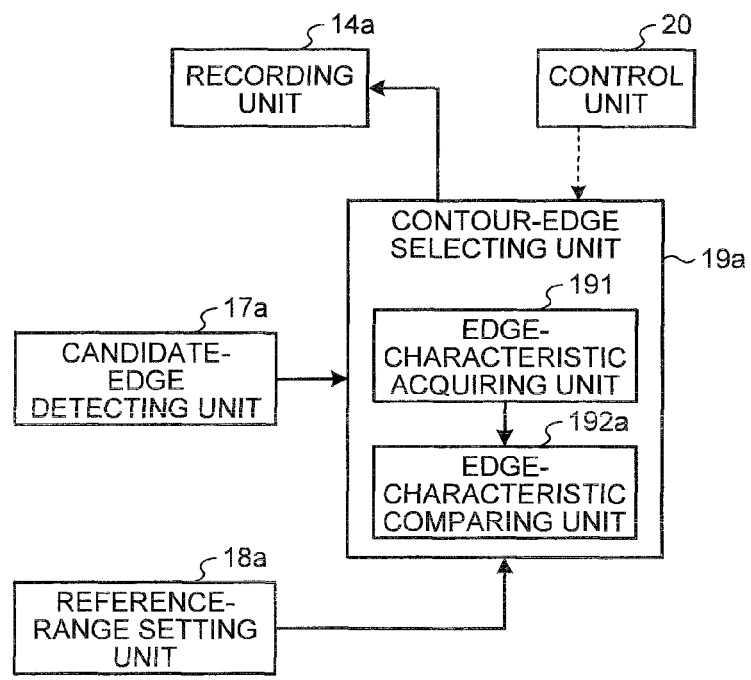
FIG. 30 is a block diagram of a configuration example of a contour-edge selecting unit according to the second embodiment.

A configuration of an image processing apparatus according to a second embodiment will be described. FIG. 27 is a block diagram of a functional configuration example of an image processing apparatus 1a according to the second embodiment. FIG. 28 is a block diagram of a configuration example of a candidate-edge detecting unit 17a included in an calculation unit 15a. FIG. 29 is a block diagram of a configuration example of a reference-range setting unit 18a according to the second embodiment. FIG. 30 is a block diagram of a configuration example of a contour-edge selecting unit 19a. The same components as those described in the first embodiment are denoted by the same reference codes. As illustrated tin FIG. 27, the image processing apparatus 1a of the second embodiment includes the external I/F unit 11, the operating unit 12, the display unit 13, a recording unit 14a, the calculation unit 15a, and the control unit 20 that controls the whole operation of the image processing apparatus 1a.

In the recording unit 14a, an image processing program 141a is recorded that is used for implementing processing according to the second embodiment in order to detect a contour edge (a contour edge of a mucosal structure) from an intraluminal image.

The calculation unit 15a includes the gradient-magnitude calculating unit 16, the candidate-edge detecting unit 17a, the reference-range setting unit 18a, and the contour-edge selecting unit 19a. The gradient-magnitude calculating unit 16, the candidate-edge detecting unit 17a, and the contour-edge selecting unit 19a are connected in this order. The gradient-magnitude calculating unit 16 is connected to the reference-range setting unit 18a, the candidate-edge detecting unit 17a is connected to the reference-range setting unit 18a, and the reference-range setting unit 18a is connected to the contour-edge selecting unit 19a.

The candidate-edge detecting unit 17a detects contour-candidate edge positions on the basis of a gradient magnitude of each pixel. As illustrated in FIG. 28, the candidate-edge detecting unit 17a includes a candidate-edge-line detecting unit 173a and a thresholding unit 175a. The candidate-edge-line detecting unit 173a is connected to the thresholding unit 175a.

The candidate-edge-line detecting unit 173a detects an edge line on the basis of the gradient magnitude of each pixel input from the gradient-magnitude calculating unit 16. The candidate-edge-line detecting unit 173a includes a thinning unit 174a. According to the second embodiment, the thinning unit 174a detects a thinned edge line on the basis of the gradient magnitude of each pixel. In this example, the thinned edge line is an edge line with a 1-pixel width. The detected edge line (the thinned edge line) is output to the thresholding unit 175a. The thresholding unit 175a performs thresholding on gradient magnitudes of respective pixels on the input edge line, and detects pixels that have gradient magnitudes equal to or greater than a predetermined threshold on the edge line. For example, the thresholding unit 175a performs known hysteresis thresholding. The candidate-edge detecting unit 17a structured as above determines, as the contour-candidate edge positions, pixels that have large gradient magnitudes on the edge line and that are detected by the thresholding unit 175a, and outputs the contour-candidate edge positions to the reference-range setting unit 18a and the contour-edge selecting unit 19a.

The reference-range setting unit 18a sets reference ranges to be referred to when the contour-edge selecting unit 19a selects a contour edge position from among the contour-candidate edge positions. As illustrated in FIG. 29, the reference-range setting unit 18a includes a reference-direction specifying unit 181a and a reference-range acquiring unit 182a. The reference-direction specifying unit 181a is connected to the reference-range acquiring unit 182a.

The reference-direction specifying unit 181a specifies directions (reference directions) for setting reference ranges. The reference-direction specifying unit 181a includes a reference-direction calculating unit 184a. The reference-direction calculating unit 184a calculates a normal direction of a contour-candidate edge line for each contour-candidate edge position on the basis of the gradient magnitude of each pixel input from the gradient-magnitude calculating unit 16 and on the basis of the contour-candidate edge positions input from the candidate-edge detecting unit 17a, and sets the normal direction as the reference direction at the corresponding contour-candidate edge position. The calculated reference direction of each contour-candidate edge position is output to the reference-range acquiring unit 182a.

The reference-range acquiring unit 182a includes a gradient-magnitude thresholding unit 183a, and acquires a reference range along the reference direction for each of the contour-candidate edge positions, on the basis of the reference direction of each contour-candidate edge position that has been input to the reference-range acquiring unit 182a and the gradient magnitude of each pixel that has been input from the candidate-edge detecting unit 17a. The reference-range setting unit 18a structured as above outputs the reference range of each contour-candidate edge position to the contour-edge selecting unit 19a.

The contour-edge selecting unit 19a selects a contour edge position from among the contour-candidate edge positions. As illustrated in FIG. 30, the contour-edge selecting unit 19a includes the edge-characteristic acquiring unit 191 and an edge-characteristic comparing unit 192a. The edge-characteristic acquiring unit 191 is connected to the edge-characteristic comparing unit 192a.

The edge-characteristic comparing unit 192a selects a contour edge position from each of the reference ranges of the contour-candidate edge positions, on the basis of the reference range of each contour-candidate edge position input from the reference-range setting unit 18a and on the basis of the edge characteristic of each contour-candidate edge position that has been acquired by the edge-characteristic acquiring unit 191 in accordance with the contour-candidate edge positions input from the candidate-edge detecting unit 17a.

Figure 31:
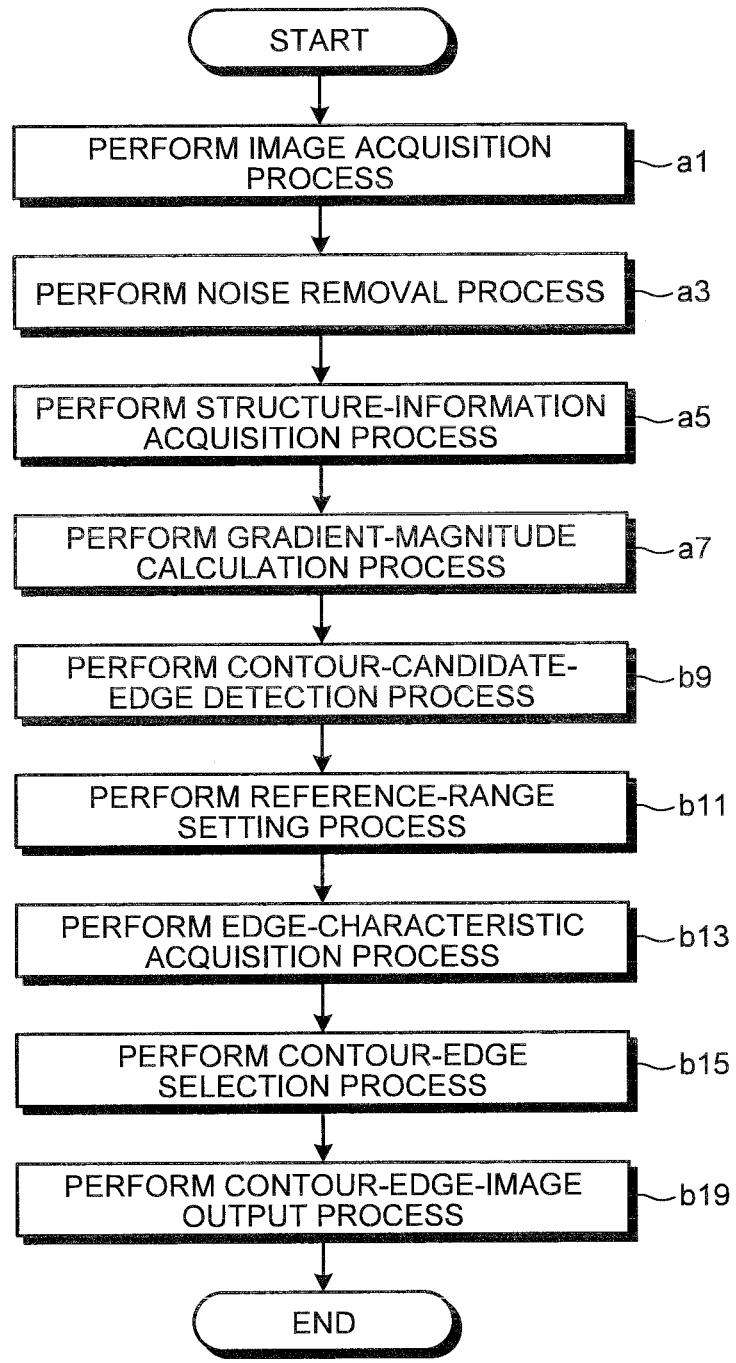
FIG. 31 is an overall flowchart of a procedure of processes performed by the image processing apparatus according to the second embodiment.

FIG. 31 is an overall flowchart of a procedure of processes performed by the image processing apparatus 1a according to the second embodiment. The processes explained below are implemented by causing the units of the image processing apparatus 1a to operate in accordance with the image processing program 141a recorded in the recording unit 14a. In FIG. 31, the same processes as those of the first embodiment are denoted by the same reference codes.

As illustrated in FIG. 31, according to the second embodiment, after the differential processing unit 163 of the gradient-magnitude calculating unit 16 (see FIG. 2) performs the gradient-magnitude calculation process at Step a7 to calculate the signed gradient magnitude for each pixel, the candidate-edge detecting unit 17a performs contour-candidate-edge detection process (Step b9).

In the contour-candidate-edge detection process, the thinning unit 174a of the candidate-edge-line detecting unit 173a detects contour-candidate edge positions to be candidates for the contour edge position, on the basis of the gradient magnitude of each pixel in the same manner as in the first embodiment. More specifically, a gradient maximum change direction of each pixel is calculated, and a gradient change direction of each pixel is detected on the basis of the calculated maximum change direction. Thereafter, a convex position of the gradient magnitudes is detected on the basis of the gradient change direction of each pixel, so that a thinned edge line (an edge line with a 1-pixel width) is obtained.

Thereafter, pixels of which values of the gradient magnitudes are small are excluded from pixels on the detected edge line, so that the contour-candidate edge positions are narrowed down. More specifically, the thresholding unit 175a performs hysteresis thresholding in order to detect pixels of which values of gradient magnitudes are equal to or greater than a predetermined threshold on the edge line, so that final contour-candidate edge positions are obtained.

FIG. 32(a) is a schematic diagram illustrating an example of edge lines detected in the preceding processing. In the figure, three edge lines EL51, EL52, and EL53 are illustrated. FIG. 32(b) and FIG. 32(c) illustrate change curves of gradient magnitudes on the edge line EL52 in FIG. 32(a) on the assumption that a horizontal axis represents a coordinate (x, y) on the edge line EL52 and a vertical axis represents a value of the gradient magnitude of each pixel. The thresholding unit 175a performs thresholding on the gradient magnitudes on the edge line EL52 by using a first threshold indicated in FIG. 32(b), thereby detecting, as a contour-candidate edge position, a range of gradient magnitudes that are equal to or greater than the threshold, in particular, a range from a pixel P53 to a pixel P54 on the edge line EL52 illustrated in FIG. 32(a). Subsequently, the thresholding unit 175a performs thresholding on the gradient magnitudes on the edge line EL52 by using a second threshold, which is smaller than the first threshold as indicated in FIG. 32(c), thereby further detecting, as contour-candidate edge positions, ranges of pixels that are on the edge line E52 and continued from the pixels P53 and P54 being end points of the range that has been detected by the thresholding with the first threshold. More specifically, a range from a pixel P51 to the pixel P53 and a range from the pixel P54 to a pixel P55 are detected as the contour-candidate edge positions. A range from the pixel P55 to a pixel P52 on the edge line EL52 is not detected as a contour-candidate edge position. Similarly, contour-candidate edge positions are narrowed down for the contour-candidate edge line EL51 and EL53.

In the second embodiment, as an algorithm for specifically implementing the processing at Step a3 to Step b9 illustrated in FIG. 31, a known Canny edge detection algorithm may be used (see J. Canny, "A Computational Approach to Edge Detection", IEEE Trans. on Pattern Analysis and Machine Intelligence, 8(6), pp. 679-698, 1986, or "Digital Image processing", CG-ARTS society, 209P, *Contour detection*).

Figure 33:
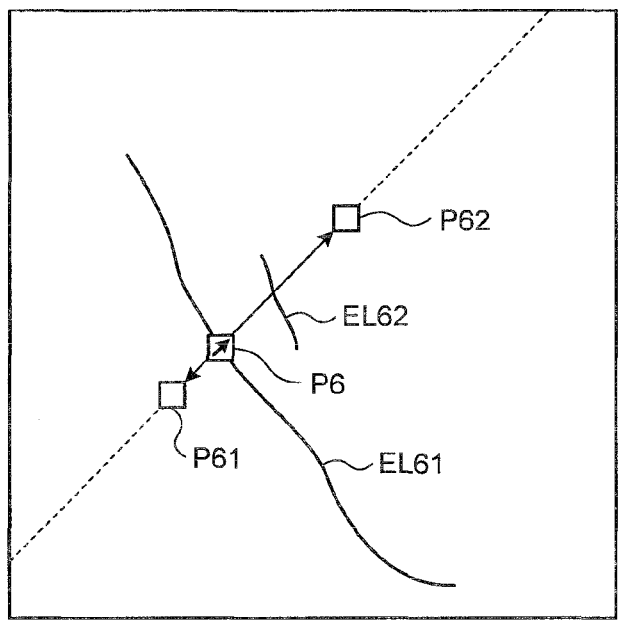
FIG. 33 is a diagram explaining a principle of setting of a reference range according to the second embodiment.

The reference-range setting unit 18a performs reference-range setting process to set a reference range for each of the contour-candidate edge positions on the basis of the gradient magnitude of each pixel calculated at Step a7 (Step b11). FIG. 33 is a diagram explaining a principle of setting of a reference range according to the second embodiment. In the figure, two contour-candidate edge lines EL61 and EL62 are illustrated. When, for example, a contour-candidate edge position P6 on the contour-candidate edge line EL61 is focused on, a range of pixels that have the same gradient directions as a gradient direction of the contour-candidate edge position P6 (e.g., a range from a pixel P61 to a pixel P62) is selected as a reference range of the contour-candidate edge position P6 from among pixels that are present along the normal direction, as indicated by a dashed line in FIG. 33, with respect to the contour-candidate edge position P6 of the contour-candidate edge line EL61.

An actual process procedure is explained below. The reference-direction calculating unit 184a of the reference-direction specifying unit 181a sequentially handles the contour-candidate edge positions as a processing object, and calculates, as the reference direction, a normal direction with respect to a contour-candidate edge position being the processing object on a contour-candidate edge line, on which the contour-candidate edge position being the processing object is present. A method of calculating the normal direction is not specifically limited. For example, the normal direction can be calculated by detecting the gradient changing direction by calculating a gradient maximum change direction in the same procedure as the processes performed by the gradient-change-direction detecting unit 171 of the first embodiment. In this case, it is possible to store, in the recording unit 14a, the gradient change direction of each pixel that has been detected when the contour-candidate edge position is detected at Step b9, and read the gradient change direction of the contour-candidate edge position being the processing object.

Thereafter, the reference-range acquiring unit 182a sequentially handles the contour-candidate edge positions as a processing object, and performs segmentation (partitioning) on the pixels present in the reference direction in the same manner as the first embodiment. More specifically, the gradient-magnitude thresholding unit 183a of the reference-range acquiring unit 182a performs thresholding on the gradient magnitude of each pixel that is present along the reference direction of the contour-candidate edge position being the processing object, so that each pixel that is present along the reference direction is assigned with any of three ranges, i.e., an upward gradient range, a downward gradient range, or a flat range. Then, a range containing the contour-candidate edge position being the processing object is determined as the reference range from among the segmented ranges.

By processing the reference-range setting process as described above in order to calculate the reference direction for each contour-candidate edge position and set a reference range, it is possible to set, as the reference range, an upward gradient range or a downward gradient range containing the contour-candidate edge position in the reference direction that is along the gradient change direction of the contour-candidate edge position. Therefore, in the subsequent processing, it is possible to select one contour edge position for each gradient containing the contour-candidate edge position, so that the detection accuracy of the contour edge can be improved.

As illustrated in FIG. 31, the edge-characteristic acquiring unit 191 of the contour-edge selecting unit 19a performs edge-characteristic acquisition process to acquire an edge characteristic of each contour-candidate edge position detected at Step b9 (Step b13). The edge-characteristic acquisition process is performed in the same manner as the processing at Step a13 of FIG. 6 explained in the first embodiment.

Subsequently, the edge-characteristic comparing unit 192a performs contour-edge selection process to select one contour edge position in each of the reference ranges that are set for the respective contour-candidate edge positions at Step b11 (Step b15).

Figure 34:
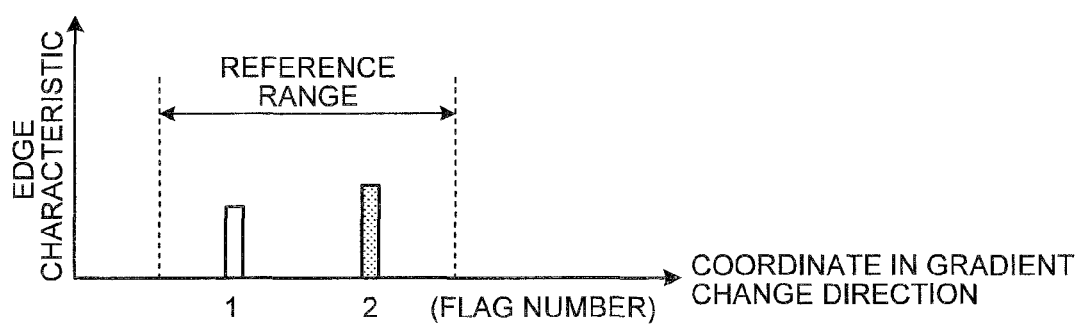
FIG. 34 is a diagram explaining a principle of selection of a contour edge position according to the second embodiment.

FIG. 34 is a diagram explaining a principle of selection of a contour edge position according to the second embodiment when one contour-candidate edge position is focused on. In the figure, values of edge characteristics of respective pixels in the reference range are illustrated on the assumption that a horizontal axis represents a coordinate of the focused contour-candidate edge position in the reference direction and a vertical axis represents an edge characteristic of the focused contour-candidate edge position in the reference range. According to the second embodiment, as illustrated in FIG. 34, a flag number is assigned to each contour-candidate edge position in the reference range. Then, the edge characteristics with the respective flags are compared with each other, and a contour-candidate edge position assigned with the flag number corresponding to a greater value of the edge characteristic (in the example of FIG. 34, the flag number "2") is selected as the contour edge position in the reference range that has been set for the contour-candidate edge position being the processing object. At this time, when a plurality of the maximum values of the edge characteristics is contained in the reference range, similarly to the first embodiment, the leftmost position is selected in the upward gradient reference range (on the left side in FIG. 34) and the rightmost position is selected in the downward gradient reference range (on the right side in FIG. 34).

The above processing is performed on all of the contour-candidate edge positions, and a contour edge image is obtained, in which pixel values of pixels determined as the contour edge positions are set to, for example, "1" and pixel values of the other pixels are set to "0". Thereafter, the calculation unit 15a performs the contour-edge-image output process similarly to the first embodiment to output the contour edge image, which has been obtained as a result of the contour-edge selection process at Step b15, to the recording unit 14a for example (Step b19).

As described above, according to the second embodiment, a normal direction of the contour-candidate edge line at each contour-candidate edge position is calculated for each contour-candidate edge position, and a range of gradients containing the contour-candidate edge position in the calculated reference direction is set as the reference range. Then, one contour-candidate edge position is selected, as the contour edge position, in each reference range for each contour candidate edge. Accordingly, it is possible to select one contour edge position in a reference range that is set for each contour-candidate edge position, i.e., in a range of gradients that are arranged along the reference direction being the normal direction of the contour-candidate edge line at a corresponding contour-candidate edge position and that contains the corresponding contour-candidate edge position. Therefore, it is possible to achieve the same advantages as those of the first embodiment, so that a contour edge of a mucosal structure can be detected from an intraluminal image with high precision.

Third Embodiment

Figure 35:
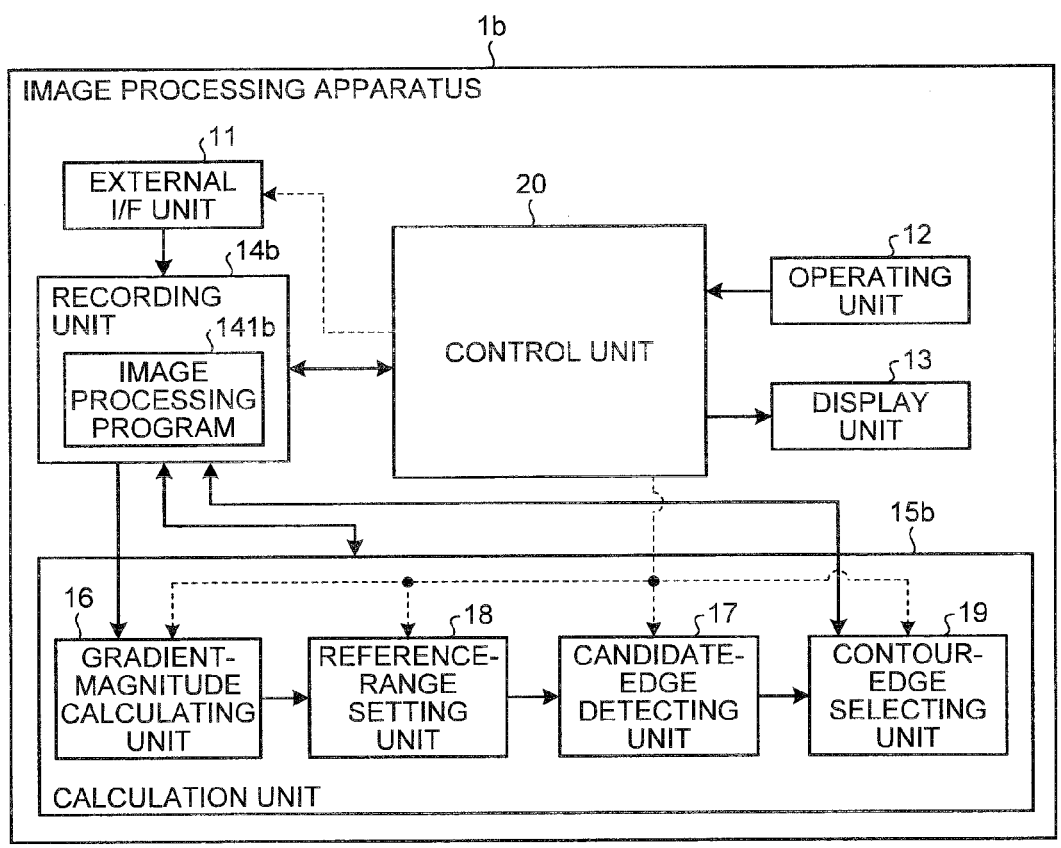
FIG. 35 is a block diagram of a functional configuration example of an image processing apparatus according to a third embodiment.

A configuration of an image processing apparatus according to a third embodiment will be described below. FIG. 35 is a block diagram of a functional configuration example of an image processing apparatus 1b according to the third embodiment. The same components as those explained in the first embodiment are denoted by the same reference codes. As illustrated in FIG. 35, the image processing apparatus 1b of the third embodiment includes the external I/F unit 11, the operating unit 12, the display unit 13, a recording unit 14b, a calculation unit 15b, and the control unit 20 that controls the overall operation of the image processing apparatus 1b.

In the recording unit 14b, an image processing program 141b is recorded that implements processing according to the third embodiment in order to detect a contour edge from an intraluminal image (a contour edge of a mucosal structure).

The calculation unit 15b includes the gradient-magnitude calculating unit 16, the candidate-edge detecting unit 17, the reference-range setting unit 18, and the contour-edge selecting unit 19, which are explained in the first embodiment. These units are connected in the following order: the gradient-magnitude calculating unit 16, the reference-range setting unit 18, the candidate-edge detecting unit 17, and the contour-edge selecting unit 19. That is, the third embodiment is different from the first embodiment in that the gradient-magnitude calculating unit 16 is connected to the reference-range setting unit 18 and the reference-range setting unit 18 is connected to the candidate-edge detecting unit 17. The gradient-magnitude calculating unit 16 calculates a gradient magnitude of each pixel by processing an intraluminal image and outputs the gradient magnitude to the reference-range setting unit 18. The reference-range setting unit 18 sets a reference range for each reference direction and outputs the reference range to the candidate-edge detecting unit 17. The candidate-edge detecting unit 17 detects contour-candidate edge positions and outputs the contour-candidate edge positions to the contour-edge selecting unit 19. The contour-edge selecting unit 19 selects a contour edge position from the contour-candidate edge positions and outputs the contour edge position to, for example, the recording unit 14b for storing the contour edge position.

Figure 36:
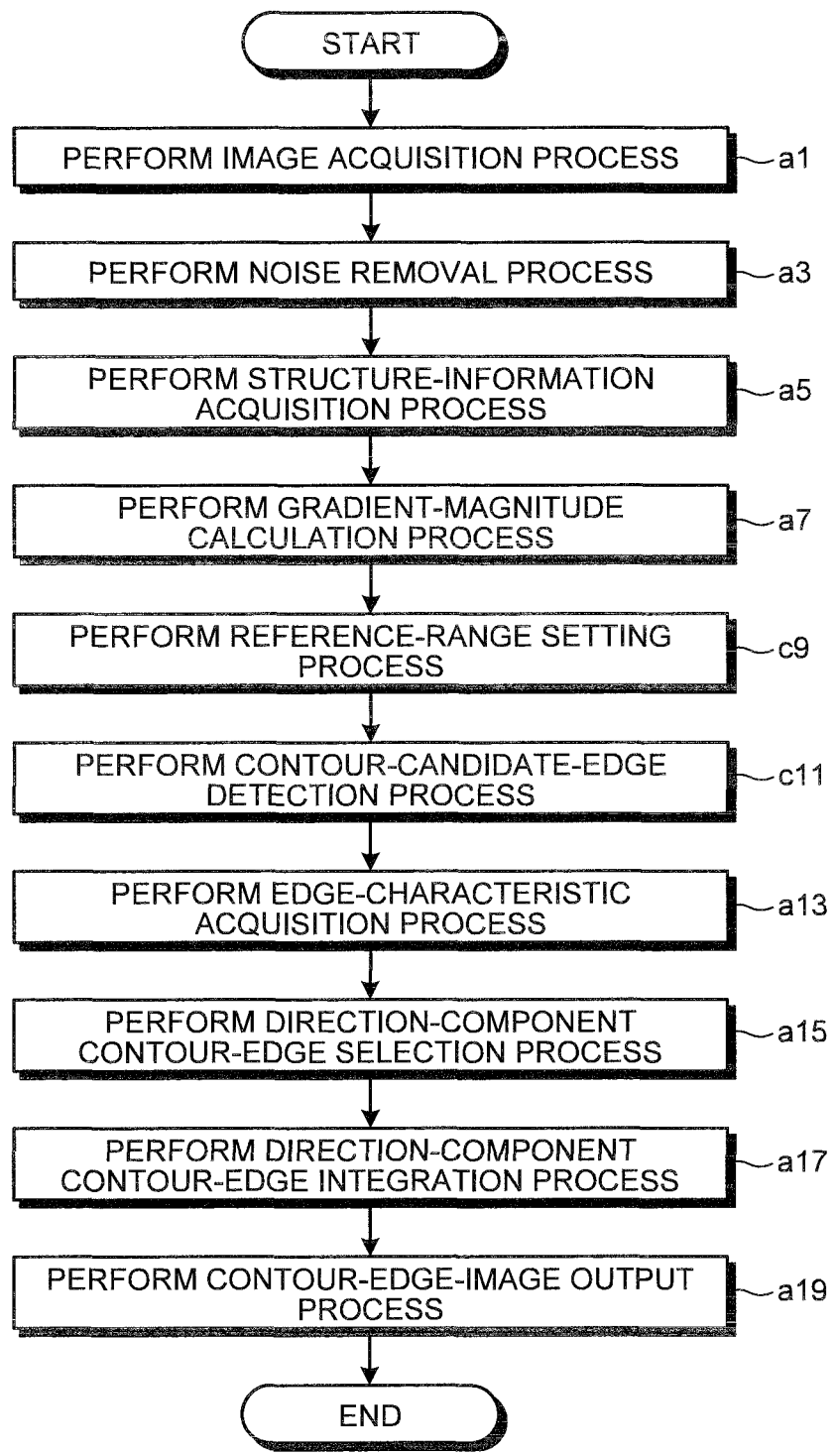
FIG. 36 is an overall flowchart of a procedure of processes performed by the image processing apparatus according to the third embodiment.

FIG. 36 is an overall flowchart of a procedure of processes performed by the image processing apparatus 1b according to the third embodiment. The processes explained below is implemented by causing the units of the image processing apparatus 1b to operate in accordance with the image processing program 141b recorded in the recording unit 14b. In FIG. 36, the same processes as those of the first embodiment are denoted by the same reference codes.

As illustrated in FIG. 36, according to the third embodiment, after the differential processing unit 163 of the gradient-magnitude calculating unit 16 (see FIG. 2) performs the gradient-magnitude calculation process at Step a7 to calculate the signed gradient magnitude for each pixel, the reference-range setting unit 18 performs reference-range setting process (Step c9). The reference-range setting process is performed in the same manner as the process performed at Step a11 of FIG. 6 explained in the first embodiment.

Subsequently, the candidate-edge detecting unit 17 performs contour-candidate-edge detection process to detect contour-candidate edge positions on the basis of the gradient magnitude of each pixel calculated at Step a7 (Step c11). A process procedure is basically the same as the process procedure at Step a9 of FIG. 6 explained in the first embodiment. However, according to the third embodiment, contour-candidate edge positions are detected in each of reference ranges corresponding to the upward gradient reference range and the downward gradient reference range that are segmented by the reference-range setting unit 18 at Step c9, and contour-candidate edge positions in a flat area are not detected. This is because it is not necessary to detect a contour edge position in the flat area. More specifically, the candidate-edge detecting unit 17 detects contour-candidate edge positions on the basis of pixels in reference ranges corresponding to the upward gradient area and the downward gradient area in the lateral-component gradient magnitude image and on the basis of pixels in reference ranges corresponding to the upward gradient area and the downward gradient area in the longitudinal-component gradient magnitude image, by referring to the lateral-reference-range segmented image and the longitudinal-reference-range segmented image. Thereafter, the process proceeds to Step a13.

As described above, according to the third embodiment, it is possible to achieve the same advantages as those of the first embodiment. Furthermore, it is possible to detect a contour-candidate edge position by using only the upward gradient area and the downward gradient area as processing objects without using the flat area as the processing object. Therefore, compared with the first embodiment in which all of the pixels are handled as the processing objects when detecting the contour-candidate edge positions, processing time can be reduced.

The image processing apparatus 1 of the first embodiment, the image processing apparatus 1a of the second embodiment, and the image processing apparatus 1b of the third embodiment may be realized by causing a computer system, such as a personal computer or a workstation, to execute a computer program that is prepared in advance. In the following, a computer system that has the same functions as those of the image processing apparatus 1, 1a, or 1b of each of the first to the third embodiments and that executes the image processing program 141, 141a, or 141b will be explained below.

Figure 37:
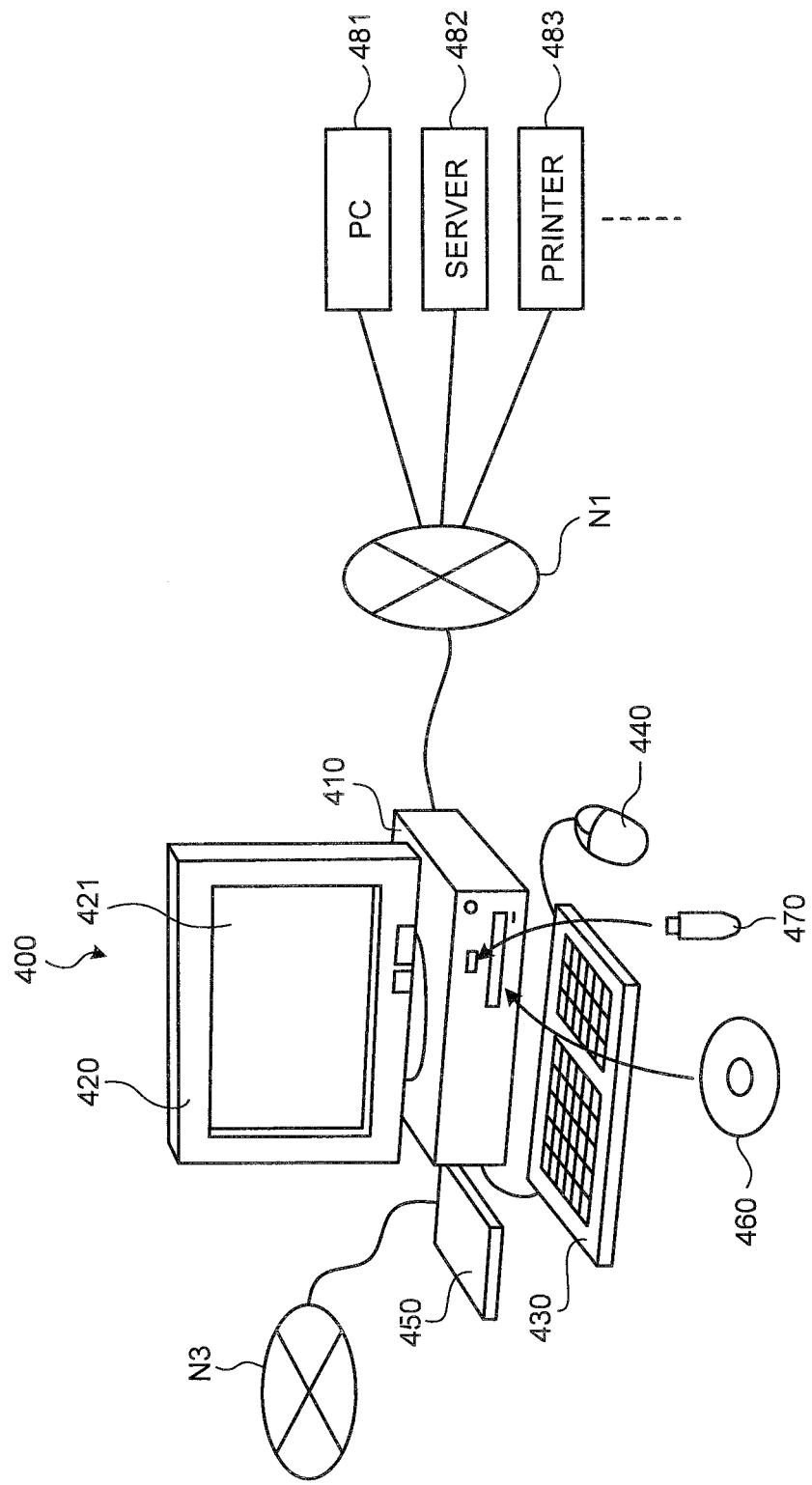
FIG. 37 is a system configuration diagram of a computer system to which the present invention is applied.
Figure 38:
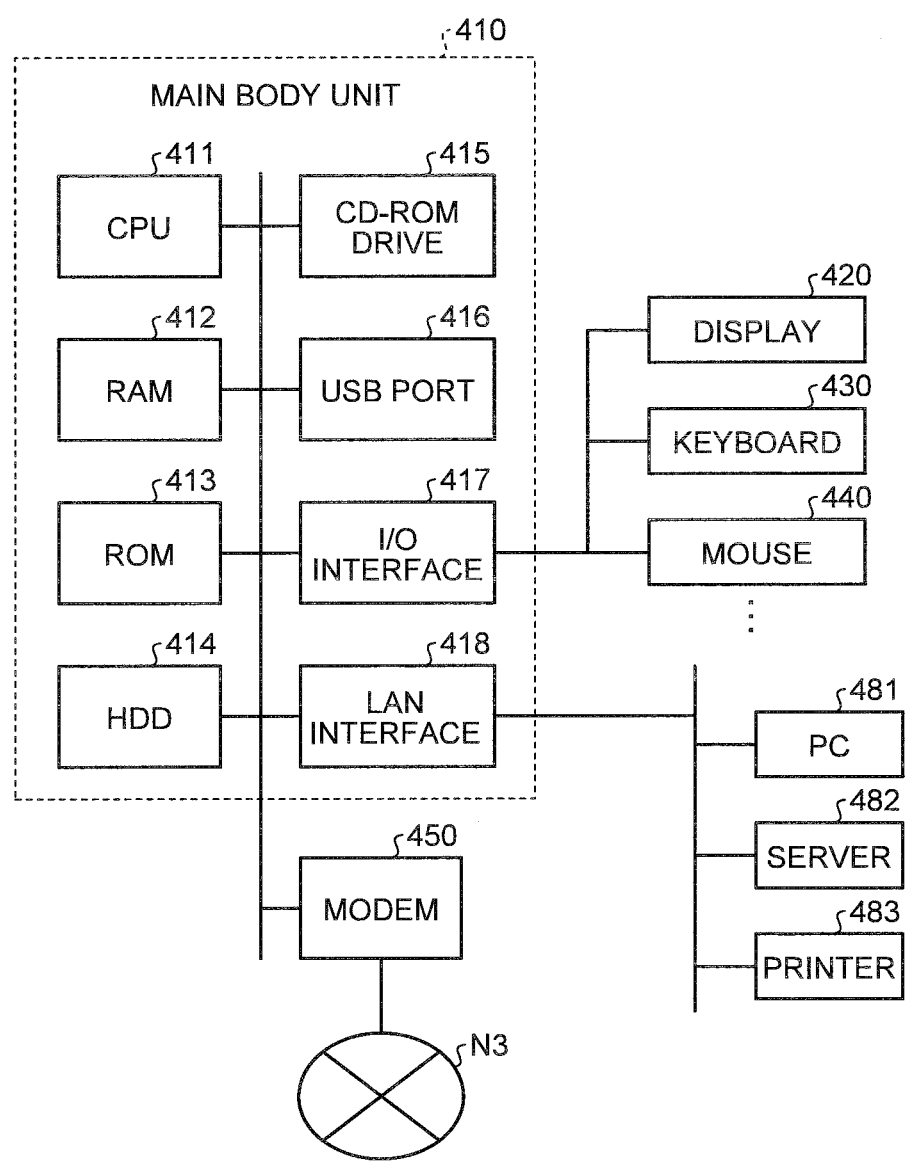
FIG. 38 is a block diagram of a configuration of a main body unit of the computer system illustrated in FIG. 37.

FIG. 37 is a system configuration diagram of a computer system 400 according to a modification. FIG. 38 is a block diagram of a configuration of a main body unit 410 of the computer system 400. As illustrated in FIG. 37, the computer system 400 includes the main body unit 410; a display 420 for displaying information, such as an image, on a display screen 421 in response to an instruction from the main body unit 410; a keyboard 430 for inputting various types of information on the computer system 400; and a mouse 440 for specifying any positions on the display screen 421 of the display 420.

As illustrated in FIGS. 37 and 38, the main body unit 410 of the computer system 400 includes a CPU 411; a RAM 412; a ROM 413; a hard disk drive (HDD) 414; a CD-ROM drive 415 for receiving a CD-ROM 460; a USB port 416 for detachably connects a USB memory 470; an I/O interface 417 for connecting the display 420, the keyboard 430, and the mouse 440; and a LAN interface 418 for connecting to a local area network or a wide area network (LAN/WAN) N1.

The computer system 400 is connected to a modem 450 for connecting to a public line N3, such as the Internet. Also, the computer system 400 is connected to other computer systems, such as a personal computer (PC) 481, a server 482, and a printer 483, via the LAN interface 418 and the local area network or the wide area network N1.

The computer system 400 reads and executes an image processing program recorded in a recording medium (e.g., the image processing program 141 of the first embodiment, the image processing program 141a of the second embodiment, or the image processing program 141b of the third embodiment) to realize an image processing apparatus (e.g., the image processing apparatus 1 of the first embodiment, the image processing apparatus 1a of the second embodiment, or the image processing apparatus 1b of the third embodiment). The recording medium may be any recording media that records an image processing program that can be read by the computer system 400. Examples of the recording media include a "portable physical medium" such as the CD-ROM 460, the USB memory 470, an MO disk, a DVD disk, a flexible disk (FD), and an IC card; a "fixed physical medium", such as the HDD 414 provided inside or outside of the computer system 400, the RAM 412, and the ROM 413; and a "communication medium", such as the public line N3 connected via the modem 450 and the local area network or the wide area network N1 connected to the PC 481 or the server 482 as other computer systems.

That is, the image processing program is recorded in a recording medium, such as the "portable physical medium", the "fixed physical medium", or the "communication medium", in a computer-readable manner, and the computer system 400 reads and executes the image processing program from such a recording medium, thereby realizing the image processing apparatus. The image processing program is not limited to that executed by the computer system 400. The present invention can be applied to a case in which the PC 481 or the server 482 as the other computer system performs the image processing program, or these device execute the image processing program in cooperation with each other.

The present invention is not limited to the above first to third embodiments and the above modification as they are. Various other inventions can be made by appropriately combine any components disclosed in the embodiments and the modification. For example, it is possible to remove some components from the components described in the embodiments and the modification. It is also possible to appropriately combine any components that are described in different embodiments or modification.

According to an aspect of the present invention described above, it is possible to detect a contour edge of a target object from a target image with high precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising at least one processor which functions as:
    a gradient-magnitude calculating unit that calculates a gradient magnitude of each pixel on the basis of pixel values of a target image in which a predetermined target object is imaged;
    a candidate-edge detecting unit that detects contour-candidate edge positions on the basis of the gradient magnitude of each pixel;
    a reference-range setting unit that sets a reference range, which is an area of the target image to be referred to when a contour edge position is selected from among the contour-candidate edge positions, on the basis of the gradient magnitude of each pixel; and
    a contour-edge selecting unit that selects, as the contour edge position, one of the contour-candidate edge positions in the reference range.

2. The image processing apparatus according to claim 1, wherein the gradient-magnitude calculating unit includes a noise removing unit that removes noise from the target image.

3. The image processing apparatus according to claim 1, wherein the gradient-magnitude calculating unit includes a structure-information acquiring unit that acquires shape change information on a surface of the target object on the basis of pixel values of the target image.

4. The image processing apparatus according to claim 1, wherein the gradient-magnitude calculating unit includes a differential processing unit that performs a differential filter process on the target image to calculate the gradient magnitude of each pixel.

5. The image processing apparatus according to claim 1, wherein the candidate-edge detecting unit includes:
a gradient-change-direction detecting unit that detects a gradient change direction of each pixel on the basis of the gradient magnitude of each pixel; and
a convex-position detecting unit that detects, as a convex position, a pixel at which a change in a gradient magnitude is greatest in an area in a same gradient direction, on the basis of the gradient change direction of each pixel;
wherein the convex position is set as the contour-candidate edge position.

6. The image processing apparatus according to claim 1, wherein the candidate-edge detecting unit includes:
a candidate-edge-line detecting unit that detects an edge line on the basis of the gradient magnitude of each pixel; and
a thresholding unit that performs thresholding on gradient magnitudes of pixels on the edge line, and detects a pixel of which value of a gradient magnitude is equal to or greater than a predetermined threshold from the pixels on the edge line;
wherein the pixel of which value of the gradient magnitude is equal to or greater than the predetermined threshold on the edge line is set as the contour-candidate edge position.

7. The image processing apparatus according to claim 6, wherein the candidate-edge-line detecting unit includes a thinning unit that detects a thinned edge line on the basis of the gradient magnitude of each pixel.

8. The image processing apparatus according to claim 6, wherein the thresholding unit performs hysteresis thresholding to detect a pixel of which value of the gradient magnitude is equal to or greater than the predetermined threshold from the pixels on the edge line.

9. The image processing apparatus according to claim 1, wherein the reference-range setting unit includes:
a reference-direction specifying unit that specifies a reference direction by which the reference range is set; and
a reference-range acquiring unit that acquires, as the reference range, a range that contains the contour-candidate edge position and that has a continuous upward gradient or a continuous downward gradient in the reference direction.

10. The image processing apparatus according to claim 9, wherein:
the reference-direction specifying unit specifies a plurality of reference directions; and
the reference-range acquiring unit acquires a reference range for each of the reference directions.

11. The image processing apparatus according to claim 10, wherein the reference directions are two or more directions including a lateral direction and a longitudinal direction of the target image.

12. The image processing apparatus according to claim 9, wherein the reference-direction specifying unit includes a reference-direction calculating unit that calculates a normal direction of the contour-candidate edge position as the reference direction.

13. The image processing apparatus according to claim 9, wherein the reference-range acquiring unit includes a gradient-magnitude thresholding unit that performs thresholding on a value of the gradient magnitude of a pixel in the reference direction, and acquires an upward gradient range or a downward gradient range along the reference direction.

14. The image processing apparatus according to claim 1, wherein the candidate-edge detecting unit detects the contour-candidate edge position in the reference range that is set by the reference-range setting unit.

15. The image processing apparatus according to claim 1, wherein the contour-edge selecting unit includes:
an edge-characteristic acquiring unit that acquires a maximum value of the gradient magnitude of the contour-candidate edge position for each contour-candidate edge line on which the contour-candidate edge positions are continuously arranged, and acquires, as an edge characteristic, a contour-candidate edge position on a contour-candidate edge line corresponding to the maximum value of the gradient magnitude; and
an edge-characteristic comparing unit that compares edge characteristics of contour-candidate edge positions contained in the reference range, and selects the contour edge position on the basis of a result of comparison.

16. The image processing apparatus according claim 15, wherein:
the gradient-magnitude calculating unit calculates directional components of the gradient magnitude of each pixel, the directional components corresponding to a plurality of directions;
the candidate-edge detecting unit detects the contour-candidate edge position on the basis of the directional components of the gradient magnitude of each pixel;
the reference-range setting unit handles the directions as reference directions and sets the reference range for each of the reference directions; and
the edge-characteristic comparing unit includes:
a directional-component contour-edge selecting unit that selects a directional-component contour edge position from each of the reference ranges corresponding to the respective reference directions; and
a directional-component contour-edge integrating unit that integrates, as the contour edge, reliable directional-component contour edge positions from among the directional-component contour edge positions in each of the reference directions.

17. An image processing method comprising:
calculating a gradient magnitude of each pixel on the basis of pixel values of a target image in which a predetermined target object is imaged;
detecting contour-candidate edge positions on the basis of the gradient magnitude of each pixel;
setting a reference range, which is an area of the target image to be referred to when a contour edge position is selected from among the contour-candidate edge positions, on the basis of the gradient magnitude of each pixel; and
selecting, as the contour edge position, one of the contour-candidate edge positions in the reference range.

18. An image processing method comprising:
calculating a gradient magnitude of each pixel on the basis of pixel values of a target image in which a predetermined target object is imaged;
setting a reference range, which is an area of the target image to be referred to when a contour edge position is selected from among contour-candidate edge positions, on the basis of the gradient magnitude of each pixel;
detecting contour-candidate edge positions in the reference range on the basis of gradient magnitudes of pixels contained in the reference range; and selecting, as the contour edge position, one of the contour-candidate edge positions in the reference range.

19. A non-transitory computer-readable recording medium with an executable program stored thereon, wherein the program instructs a processor to perform:

calculating a gradient magnitude of each pixel on the basis of pixel values of a target image in which a predetermined target object is imaged;

detecting contour-candidate edge positions on the basis of the gradient magnitude of each pixel;

setting a reference range, which is an area of the target image to be referred to when a contour edge position is selected from among the contour-candidate edge positions, on the basis of the gradient magnitude of each pixel; and selecting, as the contour edge position, one of the contour-candidate edge positions in the reference range.

20. A non-transitory computer-readable recording medium with an executable program stored thereon, wherein the program instructs a processor to perform:

calculating a gradient magnitude of each pixel on the basis of pixel values of a target image in which a predetermined target object is imaged;

setting a reference range, which is an area of the target image to be referred to when a contour edge position is selected from among contour-candidate edge positions, on the basis of the gradient magnitude of each pixel;

detecting contour-candidate edge positions in the reference range on the basis of gradient magnitudes of pixels contained in the reference range; and selecting, as the contour edge position, one of the contour-candidate edge positions in the reference range.

* * * * *